United States Patent
Kedem et al.

(10) Patent No.: US 11,743,761 B2
(45) Date of Patent: *Aug. 29, 2023

(54) APPARATUS, SYSTEM AND METHOD OF COMMUNICATION DURING A TRANSMIT OPPORTUNITY (TXOP)

(71) Applicant: INTEL CORPORATION, Santa Clara, CA (US)

(72) Inventors: Oren Kedem, Modiin Maccabim-Reut (IL); Ran Mor, Herzlia (IL); Nir Paz, Azur (IL); Alon Pais, Kibbutz Harel (IL); Dror Markovich, Tel Aviv (IL); Igor Brainman, Kfar Saba (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/516,460

(22) Filed: Nov. 1, 2021

(65) Prior Publication Data
US 2022/0060936 A1   Feb. 24, 2022

Related U.S. Application Data

(63) Continuation of application No. 16/651,279, filed as application No. PCT/US2018/014170 on Jan. 18, 2018, now Pat. No. 11,178,570.

(51) Int. Cl.
*H04W 28/02*   (2009.01)
*H04L 1/1607*   (2023.01)
(Continued)

(52) U.S. Cl.
CPC ....... *H04W 28/0278* (2013.01); *H04L 1/1671* (2013.01); *H04L 1/1835* (2013.01);
(Continued)

(58) Field of Classification Search
None
See application file for complete search history.

(56) References Cited

U.S. PATENT DOCUMENTS 11,178,570 B2   11/2021   Kedem et al.
2013/0039180 A1   2/2013   Hong et al.
(Continued)

FOREIGN PATENT DOCUMENTS

WO   2015168139   11/2015
WO   2016182412   11/2016
(Continued)

OTHER PUBLICATIONS

International Search Report and the Written Opinion for International Application No. PCT/US2018/014170, dated Oct. 18, 2018, 12 pages.
(Continued)

*Primary Examiner* — Rebecca E Song
(74) *Attorney, Agent, or Firm* — Shichrur & Co.

(57) ABSTRACT

For example, a first STA may be configured to transmit to a second STA a message including a first value to indicate an available memory size at the first STA at a beginning of a TXOP, and a second value to indicate a maximal length of an A-MPDU transmission during the TXOP; to receive an initial A-MPDU from the second STA during the TXOP, a length of the initial A-MPDU is not longer than the first value; to determine a capacity value based on a current available memory size at the first STA, the capacity value to indicate whether the second STA is to be allowed to send to the first STA a subsequent A-MPDU having a length which is not longer than the second value; and to transmit to the second. STA an Ack including a buffer capacity field including the capacity value.

20 Claims, 8 Drawing Sheets

(51) Int. Cl.
  *H04L 1/1829* (2023.01)
  *H04W 8/22* (2009.01)
  *H04W 28/04* (2009.01)
  *H04W 28/22* (2009.01)
  *H04W 28/06* (2009.01)
  *H04W 84/12* (2009.01)

(52) U.S. Cl.
  CPC ............. *H04W 8/22* (2013.01); *H04W 28/04* (2013.01); *H04W 28/22* (2013.01); *H04W 28/065* (2013.01); *H04W 84/12* (2013.01)

(56) References Cited

U.S. PATENT DOCUMENTS

| | | |
|---|---|---|
| 2014/0204818 A1 | 7/2014 | Trainin et al. |
| 2016/0007283 A1 | 1/2016 | Trainin |
| 2016/0183274 A1 | 6/2016 | Trainin et al. |
| 2016/0302229 A1* | 10/2016 | Hedayat .............. H04L 12/1868 |
| 2018/0302825 A1 | 10/2018 | Trainin et al. |
| 2019/0132107 A1* | 5/2019 | Ahn ...................... H04W 84/12 |

FOREIGN PATENT DOCUMENTS

| | | |
|---|---|---|
| WO | 2017078380 | 5/2017 |
| WO | 2017099546 | 6/2017 |

OTHER PUBLICATIONS

International Preliminary Report on Patentability for International Application No. PCT/US2018/014170, dated Dec. 13, 2019, 17 pages.

IEEE Std 802.11 ™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

Office Action for Indian Patent Application No. 202047010851, dated Sep. 6, 2021, 5 pages.

Notice of Allowance for U.S. Appl. No. 16/651,279, dated Jul. 13, 2021, 17 pages.

* cited by examiner

APPARATUS, SYSTEM AND METHOD OF COMMUNICATION DURING A TRANSMIT OPPORTUNITY (TXOP)

TECHNICAL FIELD

Embodiments described herein generally relate to communication during a Transmit Opportunity (TXOP).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
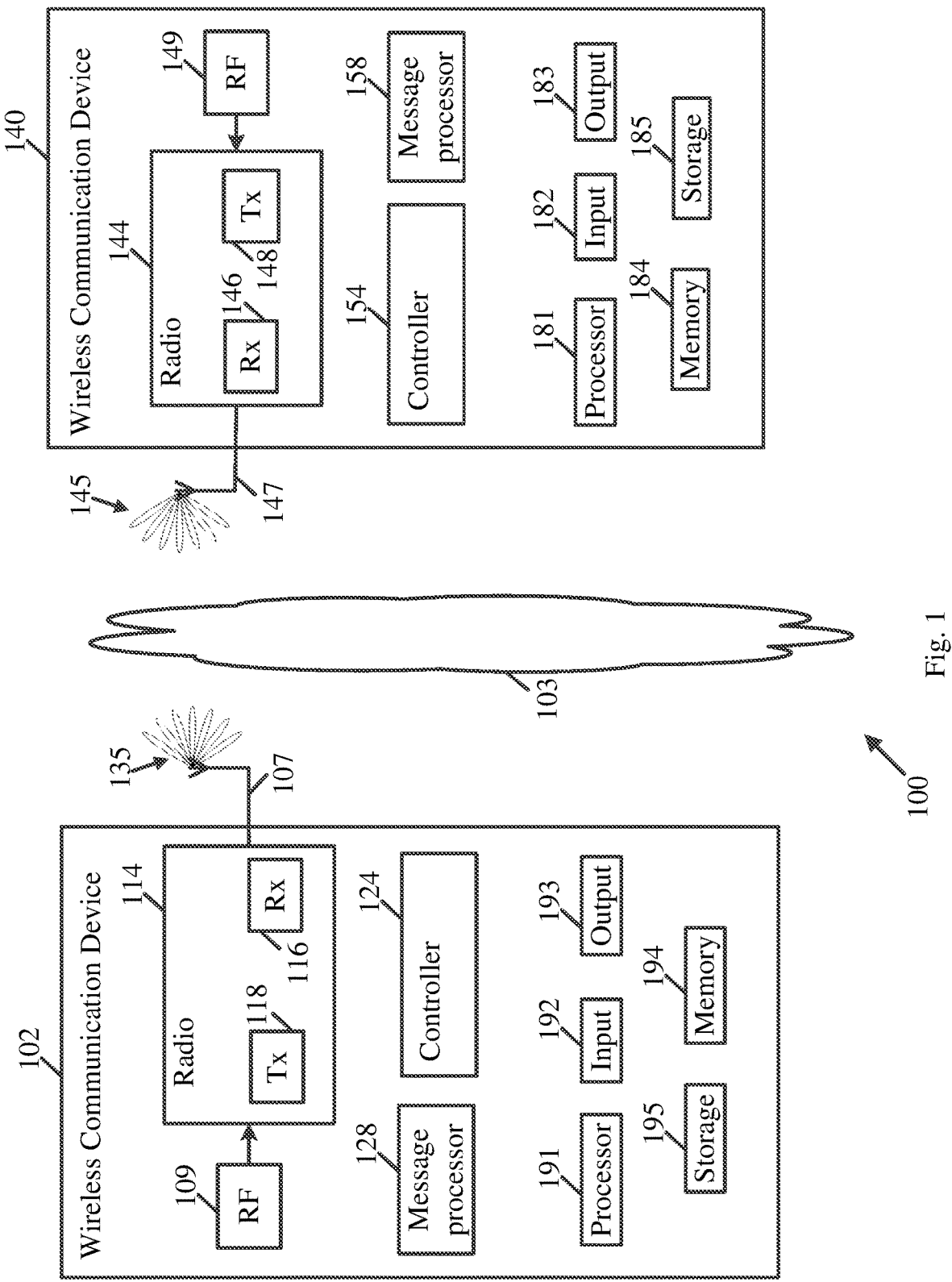
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); and/or IEEE 802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, device 102 and/or device 140 may include a mobile device or a non-mobile, e.g., a static, device.

For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, device 102 and/or device 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments device 102 and/or device 140 may be configured to communicate over a Next Generation 60 GHz (NG60) network, an Enhanced DMG (EDMG) network, and/or any other network. For example, device 102 and/or device 140 may perform Multiple-Input-Multiple-Output (MIMO) communication, for example, for communicating over the NG60 and/or EDMG networks, e.g., over an NG60 or an EDMG frequency band.

In some demonstrative embodiments, device 102 and/or device 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11-2016 Specification and/or an IEEE 802.11ad Specification.

In some demonstrative embodiments, device 102 and/or device 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, device 102 and/or device 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, device 102 and/or device 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, device 102 and/or device 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, device 102 and/or device 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, device 102 and/or device 140 may be configured to communicate over an NG60 network, an EDMG network, and/or any other network and/or any other frequency band. For example, device 102 and/or device 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, device 102 and/or device 140 may be configured to communicate over a channel bandwidth, e.g., of at least 2.16 GHz, in a frequency band above 45 GHz.

In some demonstrative embodiments, device 102 and/or device 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, device 102 and/or device 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel.

Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, device 102 and/or device 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EMDG PPDU, may include at least one non-EDMG field, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
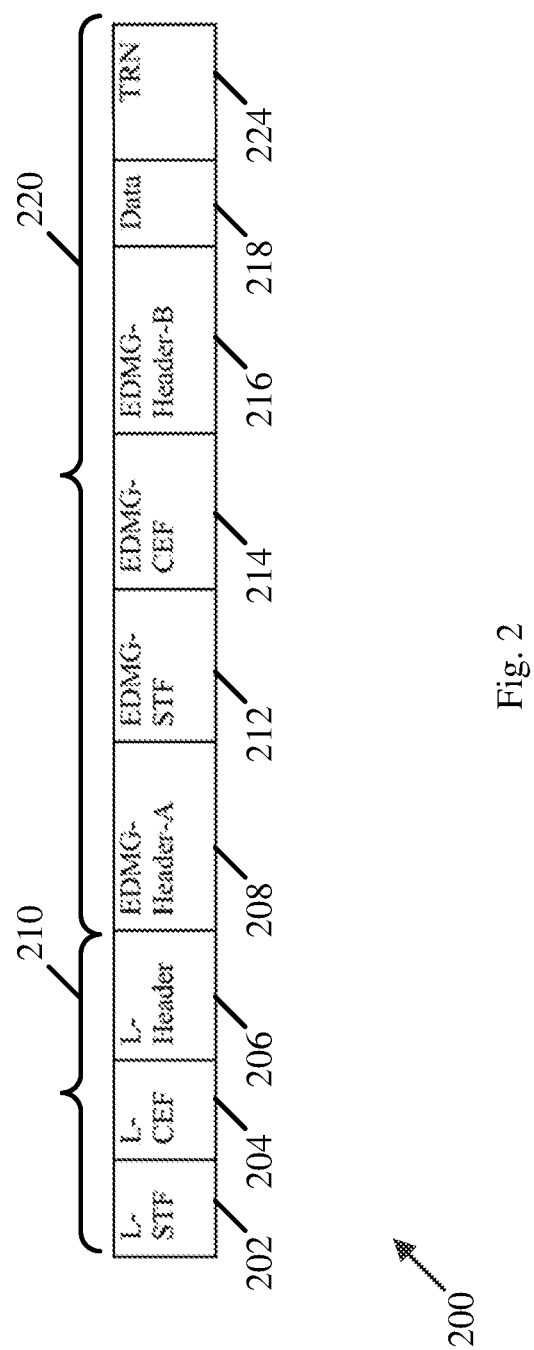
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate EDMG PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2 and/or one or more other additional or alternative fields.

Referring back to FIG. 1, in some demonstrative embodiments, in some demonstrative embodiments, device 102 and/or device 140 may communicate one or more DMG PPDUs, e.g., including one or more of the non-EDMG fields of the PPDU 200 (FIG. 2), e.g., one or more fields of portion 201 (FIG. 2) and a data field; and/or one or more EDMG PPDUs, e.g., including one or more of the EDMG fields of the PPDU 200 (FIG. 2).

In some demonstrative embodiments, devices 102 and/or 140 may have a limited memory. For example, a receiver memory may require additional silicon and/or additional gates, which may add cost, and therefore, in some implementations, may likely be limited.

In some demonstrative embodiments, device 102 and/or device 140 may be configured to communicate and process traffic of one or more different types of data traffic, for example, web browsing data, Transmission Control Protocol (TCP), User Datagram Protocol (UDP), Physical Adaptation Layer traffic, and/or the like.

In some demonstrative embodiments, device 102 and/or device 140 may have a memory, which may be shared between the different types of data traffic.

In one example, the different types of data traffic, e.g., in accordance with an IEEE 802.11 Specification, may be referred to as Access Categories (ACs). In one example, four ACs may be defined, e.g., in accordance with the IEEE 802.11 Specification. For example, the ACs may include a Best Effort AC, a Background AC, a Voice AC, and/or a Video AC. In other embodiments any other additional or alternative types of traffic and/or ACs may be defined and/or implemented.

In some demonstrative embodiments, a traffic stream may be identified by a Traffic Identifier (ID) (TID) and/or may be associated with a specific AC.

In one example, one or more implementations may utilize a shared memory, which may be shared, for example, by two or more ACs. For example, a m memory may be shared for traffic streams corresponding to the Best Effort and the Background traffic ACs, which do not need strict quality of service.

In another example, one or more implementations may utilize one or more dedicated memories for one or more respective ACs. For example, a dedicated memory may be implemented for traffic streams corresponding to the Voice AC; and/or a dedicated memory may be implemented for a Video AC, which may require a strict low latency.

In some demonstrative embodiments, there may be a need to address a technical problem, which may arise when wireless communication devices, which may be required to support a high throughput traffic over the wireless medium, may encounter one or more delays in delivering traffic streams to a host, for example, via a host interface, e.g., as described below.

In one example, the delays in delivering the traffic streams may occur, for example, when a wireless link peak throughput may be faster than a device host interface, e.g., for a several devices implementation.

In another example, the delays in delivering the traffic streams may occur, for example, when the device host interface is in a power save mode and may take time to resume its availability.

In another example, the delays in delivering the traffic streams may occur, for example, when a host CPU is occupied and/or may not be able to allocate enough buffers, or may not be able to clear, e.g., fast enough, a received buffer.

In some demonstrative embodiments, it may be advantageous, for example, to configure a receiver device to be able to indicate to a transmitter device to hold or limit its transmissions, for example, until a receive memory of the receiver device is available again.

In some demonstrative embodiments, a receiver memory of the receiver device may be overflowed, which may cause a frame drop, for example, if the receiver device lacks the ability to limit the transmissions, e.g., if the receiver device is not able to indicate to the transmitter device to hold or limit its transmissions.

In some demonstrative embodiments, the receiver device may be configured to control transmission of received frames from the transmitter device, for example, in some deployments, use cases and/or scenarios, e.g., as described below.

In one example, in a first use case, a Transmission Opportunity (TXOP) request, e.g., in an incoming TXOP, may be sent from a TXOP originator STA to a TXOP responder STA. According to this example, the receiver of the TXOP request, e.g., the responder STA, may be able to send to the originator STA a Denial to Send (DTS) frame, in response to a Request To Send (RTS) frame from the originator STA, for example, if a receive buffer of the responder STA is occupied.

In another example, in a second use case, receiving of traffic may be a result of a TXOP originator, e.g., a TXOP owner, which may grant a Reserve Direction (RD) to a responder. According to this example, the receiver, e.g., the TXOP originator, may stop granting the RD, e.g., if a receive buffer of the TXOP originator is occupied.

In another example, in a third use case, a TXOP may be established by the TXOP originator STA, which may send an RTS to the receiver STA, and at the time of reception of the RTS, the memory at the receiver STA is available. However, during the TXOP the receive memory at the receiver STA might be overfilled by the originator STA. According to this third example, one or more flow control mechanisms may be implemented, for example, in accordance with an IEEE 802.11ad specification, as described below.

In some demonstrative embodiments, a flow control mechanism may support an optional use of a format of a Block Acknowledge (ACK) (BlockACK, BACK or BA), e.g., an "EDMG/Extended Compressed BACK" format, in which the BACK includes a Received Buffer Capacity (RBUFCAP) field.

In some demonstrative embodiments, the flow control mechanism support an optional use of a representation of the RBUFCAP field, e.g., in accordance with the IEEE 802.11ad specification.

In some demonstrative embodiments, a flow control mechanism, e.g., in accordance with the IEEE 802.11ad specification, may be complex and/or optional and, therefore, a receiver STA may not be able to rely on a transmitter STA following its indications, e.g., with respect to holding or limiting transmissions of the transmitter STA.

In some demonstrative embodiments, there may be a technical need for a flow control mechanism, which may be configured to support and/or allow a receiver STA to advertise a limited buffer capacity.

In some demonstrative embodiments, devices 102 and/or 140 may be configured to implement a flow control mechanism, which may be configured to support and/or allow a receiver STA to advertise its memory management unit, which may be implementation dependent, e.g., as described below.

In some demonstrative embodiments, devices 102 and/or 140 may be configured to implement a flow control mechanism, which may be configured to support and/or a STA to advertise an available memory size at a beginning of a TXOP, e.g., a "Flow Control Max A-MPDU size unit", e.g., as described below. For example, upon receiving of an RTS, a responder STA may be required to decide whether a receive buffer of the responder STA has enough room for an upcoming transmission, e.g., as indicated by the RTS. In one example, it may not be efficient to configure the responder STA to indicate what will be the first transmission size it is able to receive, and the responder STA may need to prepare memory availability for a maximum A-MPDU size. This scenario may create inefficiency, for example, since in some cases the TXOP may be rejected by the responder STA, e.g., due to a lack of memory space.

In some demonstrative embodiments, devices 102 and/or 140 may be configured to implement a flow control mechanism, which may be configured to support and/or a flexibility to report a capacity of a received memory, e.g., the "RBUFCAP", e.g., as described below. For example, not allowing a STA to indicate any memory availability the STA has may result in implementation constraints.

In some demonstrative embodiments, device 102 and/or 140 may be configured to implement a traffic flow control mechanism, e.g., a MAC traffic flow control mechanism, which may be configured to support and/or allow a receiver STA, e.g., a responder STA, to inform a transmitter STA, e.g., an originator STA, on a transmission delivery size the receiver STA is capable to receive in an upcoming TXOP, e.g., as described below.

In some demonstrative embodiments, the traffic flow control mechanism may be configured to provide one or more rules for the originator STA to follow, for example, based on the indicated receiver capability, e.g., as described below.

In some demonstrative embodiments, the traffic flow control mechanism may be configured to allow and/or support the responder STA to deliver the transmission delivery size that the responder STA is capable to receive in the upcoming TXOP, e.g., a receive memory occupancy, for example, using an RBUFCAP field in a BlockAck message, e.g., as described below. In other embodiments, any other field may be implemented.

In some demonstrative embodiments, device 102 and/or device 140 may be configured to implement a first mechanism, e.g., a simplified method, which may be mandatory and supported by device 102 and/or device 140, and/or a second mechanism, e.g., an enhanced method, which may be optional, and may improve efficiency and/or throughput, e.g., as described below.

In some demonstrative embodiments, device 102 and/or device 140 may be configured to implement a traffic flow control mechanism, which may be configured to allow a responder STA, e.g., device 102, to advertise a maximum transmission delivery, for example, in case a recipient memory size of the responder STA is not updated, e.g., as described below.

In some demonstrative embodiments, a formant of an RBUFCAP field, e.g., including a count value and a memory management unit size, may be defined in a manner which may enable flexibility, for example, to support and/or allow one or more different implementations and/or constraints, e.g., as described below.

In some demonstrative embodiments, device 102 and/or device 140 may be configured to implement a traffic flow control mechanism, which may be configured to support, allow and/or distinguish between a shared memory management and/or a dedicated memory management, for example, to support and/or allow different use-cases, for example, for various quality of service traffic, e.g., as described below.

In some demonstrative embodiments, a responder STA, e.g., a receiver STA, may be configured to report to an originator STA, e.g., a transmitter STA, on an available memory size at the responder STA, e.g., at the beginning of a TXOP, e.g., as described below.

In some demonstrative embodiments, a responder STA, e.g., a receiver STA, may be configured to report to an originator STA, e.g., a transmitter STA, on a maximal length of a transmission, e.g., an Aggregate Medium Access Control (MAC) Protocol Data Unit (A-MPDU) transmission, during the TXOP, e.g., as described below.

In some demonstrative embodiments, device 102 may perform one or more operations of, the role of, and/or one or more functionalities of, a responder STA; and/or device 140 may perform one or more operations of, the role of, and/or one or more functionalities of, a originator STA, e.g., as described below.

In other embodiments, device 140 may perform one or more operations of, the role of, and/or one or more functionalities of, the responder STA; and/or device 102 may perform one or more operations of, the role of, and/or one or more functionalities of, the originator STA.

In some demonstrative embodiments, controller 124 may be configured to cause, trigger, and/or control the wireless communication station implemented by device 102 to generate and transmit to device 140 a message including a first value (also referred to as "the maximal initial transmission length") to indicate an available memory size at device 102 at the beginning of a TXOP, and a second value (also referred to as "the maximal transmission length"), e.g., as described below.

In some demonstrative embodiments, device 140 may receive the message including the first and second values, e.g., as described below.

In some demonstrative embodiments, controller 154 may be configured to cause, trigger, and/or control the wireless communication station implemented by device 140 to receive from device 102 the message including the first value to indicate the available memory size at device 102 at the beginning of the TXOP, and the second value to indicate a maximal length of an A-MPDU transmission during the TXOP, e.g., as described below.

In some demonstrative embodiments, the message may include an association request or a probe request, e.g., as described below. In other embodiments, the message may include any other type of message.

In some demonstrative embodiments, device 140 may transmit to device 102, e.g., during the TXOP, an initial message, e.g., an initial A-MPDU, having a length, which is not longer than the maximal initial transmission length, e.g., as described below.

In some demonstrative embodiments, controller 154 may be configured to cause, trigger, and/or control the wireless communication station implemented by device 140 to generate and transmit an initial A-MPDU to device 102 during the TXOP. For example, a length of the initial A-MPDU may be not longer than the first value, for example, not longer than the maximal initial transmission length, indicated by the message from device 102, e.g., as described below.

In some demonstrative embodiments, device 102 may receive the initial A-MPDU from device 140, e.g., as described below.

In some demonstrative embodiments, controller 124 may be configured to cause, trigger, and/or control the wireless communication station implemented by device 102 to receive and process from device 140, e.g., during the TXOP, the initial A-MPDU, which may have the length that is not longer than the first value, e.g., as described below.

In some demonstrative embodiments, controller 124 may be configured to cause, trigger, and/or control the wireless communication station implemented by device 102 to determine a capacity value, for example, based on a current available memory size at device 102, e.g., as described below.

In some demonstrative embodiments, the capacity value may be configured to indicate whether device 140 is to be allowed to send to device 102 a subsequent A-MPDU having a length, which is not longer than the second value, for example, not longer than the maximal transmission length, e.g., as described below.

In some demonstrative embodiments, controller 124 may be configured to cause, trigger, and/or control the wireless communication station implemented by device 102 to generate and transmit to device 140 an Acknowledge (Ack) to acknowledge the initial A-MPDU, e.g., as described below.

In some demonstrative embodiments, the Ack may include a buffer capacity field including the capacity value, e.g., as described below.

In some demonstrative embodiments, the Ack may include a Block Ack (BA). In other embodiments, the Ack may include any other type of acknowledgement message.

In some demonstrative embodiments, the buffer capacity field may include a Receive Buffer Capacity (RBUFCAP) field. In other embodiments, the buffer capacity field may include any other additional or alternative field.

In some demonstrative embodiments, device 140 may receive the Ack from device 102, e.g., as described below, In some demonstrative embodiments, controller 154 may be configured to cause, trigger, and/or control the wireless communication station implemented by device 140 to receive and process the Ack from device 102 to acknowledge the initial A-MPDU. controller 154 may be configured to cause, trigger, and/or control the wireless communication station implemented by device 140 to access and/or process the buffer capacity field including the capacity value, which is based on the current available memory size at device 102, to determine whether device 140 is to be allowed to send to device 102 the subsequent A-MPDU having the length which is not longer than the second value, e.g., as described below.

In some demonstrative embodiments, controller 124 may be configured to cause, trigger, and/or control the wireless communication station implemented by device 102 to set the capacity value to a first predefined value to indicate that device 140 is not allowed to send the subsequent A-MPDU to device 102, or to a second predefined value to indicate that device 140 is allowed to send the subsequent A-MPDU to device 102, e.g., as described below.

In some demonstrative embodiments, controller 124 may be configured to cause, trigger, and/or control the wireless communication station implemented by device 102 to, for example, when the current available memory size is lower than the second value, set the capacity value to indicate that device 140 is not allowed to send the subsequent A-MPDU to device 102. For example, controller 124 may be configured to cause, trigger, and/or control the wireless communication station implemented by device 102 to set the capacity value to the first predefined value, for example, when the current available memory size is lower than the maximal transmission length, e.g., as described below.

In some demonstrative embodiments, controller 124 may be configured to cause, trigger, and/or control the wireless communication station implemented by device 102 to, when device 102 to, for example, when the current available memory size is not lower than the second value, set the capacity value to indicate that device 140 is allowed to send the subsequent A-MPDU to device 102. For example, controller 124 may be configured to cause, trigger, and/or control the wireless communication station implemented by device 102 to set the capacity value to the second predefined value, for example, when the current available memory size is greater than or equal to the maximal transmission length, e.g., as described below.

In some demonstrative embodiments, device 140 may receive the Ack including the first predefined value or the second predefined value, e.g., as described below.

In some demonstrative embodiments, controller 154 may be configured to cause, trigger, and/or control the wireless communication station implemented by device 140 to select not to transmit the subsequent A-MPDU, for example, when the capacity value is to indicate that device 140 is not allowed to send the subsequent A-MPDU, e.g., to device 102. For example, controller 154 may be configured to cause, trigger, and/or control the wireless communication station implemented by device 140 to select not to transmit the subsequent A-MPDU, for example, when the capacity value includes the first predefined value.

In some demonstrative embodiments, controller 154 may be configured to cause, trigger, and/or control the wireless communication station implemented by device 140, to send an Ack request to device 102, for example, to request to transmit the subsequent A-MPDU, for example, when the capacity value is to indicate that device 140 is not allowed to send the subsequent A-MPDU to device 102, e.g., as described below.

In some demonstrative embodiments, device 102 may receive the Ack request from device 140, e.g., as described below.

In some demonstrative embodiments, controller 124 may be configured to cause, trigger, and/or control the wireless communication station implemented by device 102 to receive from device 140 the Ack request, for example, if device 102 has set the capacity value to indicate that device 140 is not allowed to send the subsequent A-MPDU to device 102, e.g., as described below.

In some demonstrative embodiments, controller 124 may be configured to cause, trigger, and/or control the wireless communication station implemented by device 102 to transmit to device 140 a subsequent Ack to acknowledge the Ack request. For example, the subsequent Ack may include an updated capacity value based on an updated current available memory size at device 102, e.g., as described below.

In some demonstrative embodiments, the updated capacity value may indicate whether device 140 is to be allowed to send the subsequent A-MPDU to device 140, e.g., as described below.

In some demonstrative embodiments, device 140 may receive the subsequent Ack from device 102 to acknowledge the Ack request, e.g., as described below.

In some demonstrative embodiments, controller 154 may be configured to cause, trigger, and/or control the wireless communication station implemented by device 140 to receive from device 102 the subsequent Ack including the updated capacity value based on the updated current available memory size at device 102, e.g., as described below.

In some demonstrative embodiments, controller 154 may be configured to allow the wireless communication station implemented by device 140 to transmit the subsequent A-MPDU, for example, when the capacity value is to indicate that device 140 is allowed to send the subsequent A-MPDU, e.g., to device 102. For example, controller 154 may be configured to allow the wireless communication station implemented by device 140 to transmit the subsequent A-MPDU, for example, when the capacity value includes the second predefined value, e.g., as described below.

In some demonstrative embodiments, controller 154 may be configured to allow the wireless communication station implemented by device 140, when the capacity value is to indicate that device 140 is allowed to send the subsequent A-MPDU to device 102, to transmit the subsequent A-MPDU to device 102, and to receive from device 102 a subsequent Ack to acknowledge the subsequent A-MPDU, e.g., as described below.

In some demonstrative embodiments, the subsequent Ack may include an updated capacity value, for example, based on an updated current available memory size at device 102, e.g., as described below.

In some demonstrative embodiments, controller 124 may be configured to allow the wireless communication station implemented by device 102 to set the capacity value to indicate that device 140 is allowed to send the subsequent A-MPDU to device 102, to receive the subsequent A-MPDU, to determine the updated capacity value, for example, based on the updated current available memory size at device 102, and to transmit to device 140 the subsequent Ack including the updated capacity value to acknowledge the subsequent A-MPDU, e.g., as described below.

In some demonstrative embodiments, device 102 and/or device 140 may implement a first flow control mechanism, e.g., a simplified flow control mechanism, which may be configured to provide and/or support at least minimal essential mechanism for a responder STA, e.g., device 102, to hold and/or stop a transmission, e.g., the subsequent A-MPDU, from an originator STA, e.g., device 140.

In some demonstrative embodiments, the first flow control mechanism, e.g., the simplified flow control mechanism, may provide a technical solution, which may, for example, avoid a complex implementation and/or may provide a simple mechanism, for example, to protect the responder STA, e.g., from a buffer overflow.

In some demonstrative embodiments, the first flow control mechanism may utilize the buffer capacity field, e.g., the RBUFCAP field in BlockAck frames, e.g., as described below.

In some demonstrative embodiments, for example, in case a responder sends the field RBUFCAP="00" in a BACK, an originator shall not send any QoS-Data frames in the following transmission delivery until an updated non-zero RBUFCAP value is received.

In some demonstrative embodiments, for example, in case a responder sends the field RBUFCAP="00" in a BACK, the originator may truncate the TXOP or send a BlockAckReq to update the RBUFCAP.

In some demonstrative embodiments, for example, in case the responder sends a BACK with the field RBUFCAP "00", the originator may send any size of delivery, e.g., limited to the existing Block Ack agreement.

In some demonstrative embodiments, for example, the RBUFCAP value may be valid for all TID delivered in a TXOP and throughout the current TXOP only.

In some demonstrative embodiments, for example, when the TXOP has ended, a value of a recent received RBUFCAP may become non-valid.

In some demonstrative embodiments, when device 140 receives a BA including the RBUFCAP field having the first predefined value, e.g., "00" or any other predefined value, device 140 may not send a subsequent frame, e.g., any QoS-Data frames, in a following transmission delivery, for example, until an updated value in the RBUFCAP field is received, e.g., an RBUFCAP with the second predefined value, e.g., a value other than "00" or any other predefined value.

In some demonstrative embodiments, device 140 may be allowed to truncate the TXOP and/or may be allowed to send an Ack request, e.g., a BlockAckreq, for example, to request to update the capacity value in the RBUFCAP field, for example, when the RBUFCAP field in the BA includes the first predefined value.

In some demonstrative embodiments, when the RBUFCAP field in the BA includes the second predefined value, device 140 may be allowed to send any size of delivery, for example, limited to an existed Block Ack agreement, e.g., limited to the maximal transmission length, e.g., as described below.

In some demonstrative embodiments, the capacity value represented by the RBUFCAP value may be valid for all Traffic identifiers (TIDs) delivered in a TXOP and throughout the TXOP only.

In some demonstrative embodiments, when the TXOP is ended, the RBUFCAP value, e.g., of a recent received BA, may become non-valid.

Figure 3:
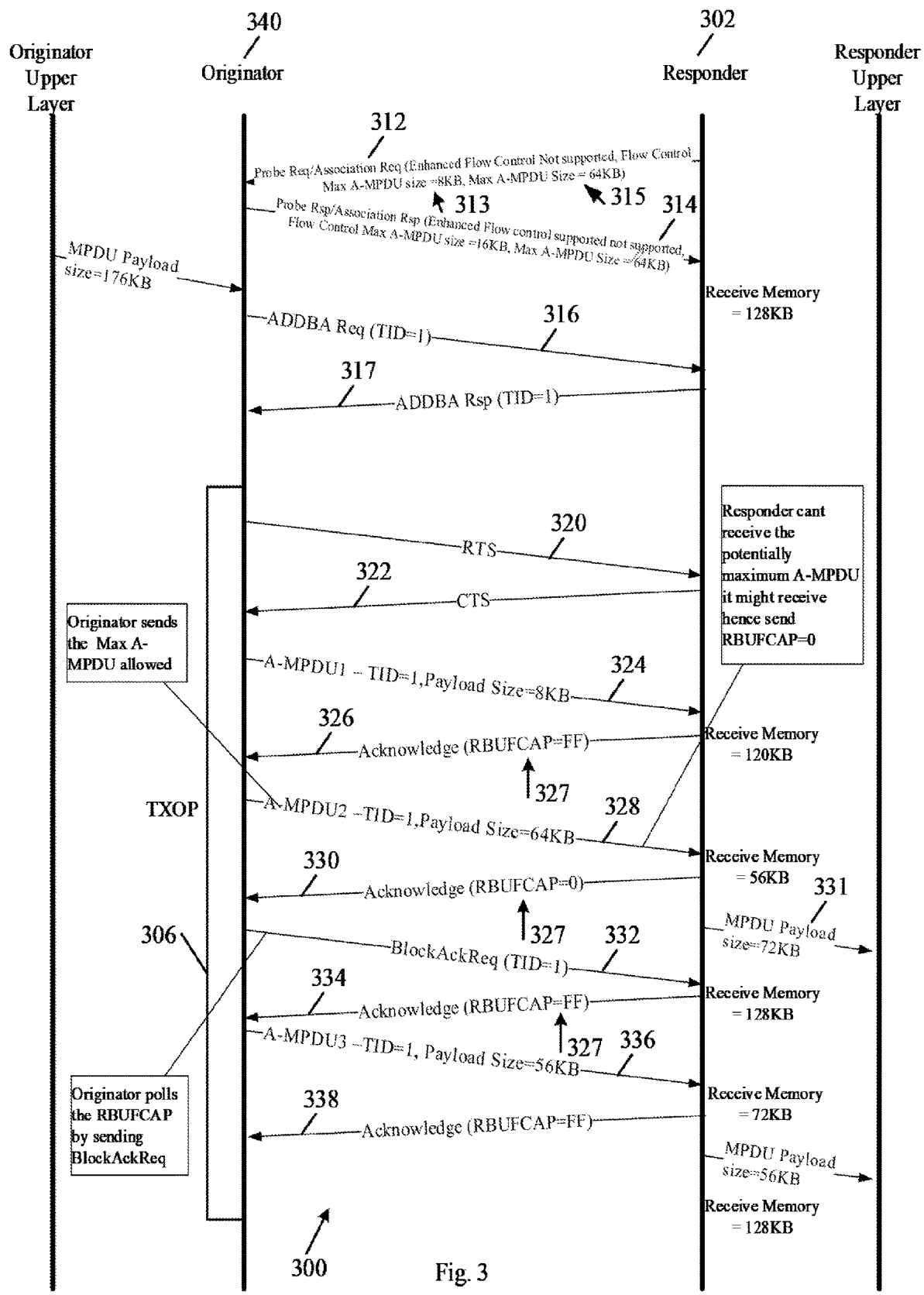
FIG. 3 is a schematic illustration of a diagram of operations and communications between an originator station (STA) and a responder STA, in accordance with some demonstrative embodiments.

Reference is made to FIG. 3, which schematically illustrates a diagram 300 of operations and communications between an originator STA 340 and a responder STA 302, in accordance with some demonstrative embodiments.

In one example, device 102 (FIG. 1) may be configured to perform one or more of the operations of, the role of, and/or one or more functionalities of, responder STA 302; and/or device 140 (FIG. 1) may be configured to perform one or more of the operations of, the role of, and/or one or more functionalities of, originator STA 340.

In some demonstrative embodiments, one or more of the operations and communications of diagram 300 may be performed, for example, according to the first flow control mechanism, for example, the simplified flow control mechanism, e.g., as described below.

In some demonstrative embodiments, as shown in FIG. 3, STA 302 may transmit a message 312 to STA 340.

In some demonstrative embodiments, as shown in FIG. 3, message 312 may include a probe request or an association request.

In some demonstrative embodiments, as shown in FIG. 3, message 312 may include a first field 313 including a first value, e.g., 8 Kilobytes (KB), to indicate an available memory size, e.g., a minimal obligated available memory size, at STA 302 at a beginning of a TXOP 306.

In some demonstrative embodiments, as shown in FIG. 3, message 312 may include a second field 315 including a second value, e.g., 64 KB, to indicate a maximal length of an A-MPDU transmission during the TXOP 306.

In some demonstrative embodiments, as shown in FIG. 3, STA 340 may transmit a message 314 to STA 340, e.g., including the first field 313 and the second field 315.

In some demonstrative embodiments, as shown in FIG. 3, message 314 may include a probe response or an association response. In other embodiments, messages 312 and/or 314 may include any other type of messages.

In some demonstrative embodiments, as shown in FIG. 3, at least one of messages 312 and/or 314 may include an indication ("Enhanced flow control") to indicate that an enhanced flow control mechanism, e.g., the enhanced mechanism described below, is not supported. Accordingly, the STA 302 and 340 may select to implement the simplified flow control mechanism, e.g., as described below.

In some demonstrative embodiments, as shown in FIG. 3, STA 302 and STA 340 may exchange an Add BA (ADDBA) request 316, and an ADDBA response 318, for example, to establish an ADDBA agreement between STA 302 and 340.

In some demonstrative embodiments, as shown in FIG. 3, an available memory size of STA 302 at the beginning of TXOP 306 may be 128 KB.

In some demonstrative embodiments, as shown in FIG. 3, STA 302 and STA 340 may exchange a Request To Send (RTS) 320, and a Clear To Send (CTS) 322, for example, to establish TXOP 306. In other embodiments, the TXOP 306 may be established according to any other mechanism and/or message exchange, e.g., using a grant frame or any other message.

In some demonstrative embodiments, as shown in FIG. 3, STA 340 may transmit an initial A-MPDU 324 to STA 302.

In some demonstrative embodiments, as shown in FIG. 3, a length of the initial A-MPDU 324 may not be longer than the first value, for example, not longer than the maximal initial transmission length, which may be equal to 8 KB, for example, since STA 340 may not be aware of the current available memory size at STA 302.

In some demonstrative embodiments, as shown in FIG. 3, after receipt of initial A-MPDU 324, an available memory size at STA 302 may be 120 KB, for example, 128 KB−8 KB=120 KB.

In some demonstrative embodiments, as shown in FIG. 3, STA 302 may transmit to STA 302 an Ack 326 to acknowledge the initial A-MPDU 324.

In some demonstrative embodiments, as shown in FIG. 3, Ack 326 may include an RBUFCAP field 327 including a capacity value including a predefined value, e.g., "FF", to indicate STA 340 is allowed to send a subsequent A-MPDU 328 to STA 302.

In one example, STA 302 may set the capacity value to a predefined value, e.g., "FF", e.g., to indicate that the STA 340 is allowed to send the subsequent A-MPDU 328, for example, since the current available memory size is larger than the Max A-MPDU size value, the maximal transmission length, for example, after receipt of initial A-MPDU 324. For example, the current available memory size is 120 KB, which is larger than the Max-AMPDU size value 64 KB.

In some demonstrative embodiments, as shown in FIG. 3, STA 340 may transmit to STA 302 a subsequent A-MPDU 328 having a length of 64 KB.

In some demonstrative embodiments, as shown in FIG. 3, the available memory size at STA 302 after receipt of A-MPDU 328 may be 56 KB, e.g., 120 KB-64 KB=56 KB.

In some demonstrative embodiments, as shown in FIG. 3, STA 302 may transmit to STA 302 an Ack 330 to acknowledge the A-MPDU 328.

In some demonstrative embodiments, as shown in FIG. 3, Ack 330 may include an RBUFCAP field 327 including a capacity value, e.g., set to a predefined value, e.g., "00", to indicate STA 340 is not allowed to send a subsequent A-MPDU to STA 302.

In one example, STA 302 may set the capacity value to "00" to indicate that the STA 340 is not allowed to send a subsequent, for example, since the current available memory size is lower than the maximal transmission length, for example, after receipt of A-MPDU 328. For example, the current available memory size may be 56 KB, which is lower than the Max-AMPDU size value, e.g., 64 KB.

In some demonstrative embodiments, as shown in FIG. 3, STA 302 may transfer data 331 having a size of 72 KB to an upper layer of STA 302, which may result in an available memory size at STA 302 of 128 KB, e.g., 56 KB+72 KB=128 KB.

In some demonstrative embodiments, as shown in FIG. 3, STA 340 may transmit an Ack request 332 to STA 302, for example, to request to transmit a subsequent A-MPDU 336.

In some demonstrative embodiments, as shown in FIG. 3, STA 302 may transmit an Ack 334 to STA 302 to acknowledge the Ack request 332.

In some demonstrative embodiments, as shown in FIG. 3, Ack 334 may include an RBUFCAP field 327 including a capacity value, e.g., the predefined value "FF", to indicate that STA 340 is allowed to send the A-MPDU 336 to STA 302.

In one example, STA 302 may set the capacity value to indicate that the STA 340 is allowed to send the A-MPDU 336, for example, since the current available memory size is larger than the Max-AMPDU size value, for example, after receipt of Ack request 332. For example, the current available memory size is 128 KB, which is larger than the Max-AMPDU size value of 64 KB.

In some demonstrative embodiments, as shown in FIG. 3, STA 340 may transmit the A-MPDU 336 having a length of 56 KB to STA 302.

In some demonstrative embodiments, as shown in FIG. 3, the available memory size at STA 302 after receipt of A-MPDU 336 may be 72 KB, e.g., 128 KB-56 KB=72 KB.

In some demonstrative embodiments, as shown in FIG. 3, STA 302 may transmit to STA 302 an Ack 338 to acknowledge the A-MPDU 336.

In some demonstrative embodiments, as shown in FIG. 3, Ack 338 may include an RBUFCAP field 327 including a capacity value, e.g., the predefined value "FF", to indicate STA 340 is allowed to send a subsequent A-MPDU to STA 302.

In one example, STA 302 may set the capacity value to indicate that the STA 340 is allowed to send the subsequent A-MPDU, for example, since the current available memory size is larger than the Max-AMPDU size value, for example, after receipt of A-MPDU 336. For example, the current available memory size may be 72 KB, which is larger than the Max-AMPDU size value, e.g., 64 KB.

In some demonstrative embodiments, diagram 300 may demonstrate a scenario in which the simplified flow control mechanism may be utilized. For example, the simplified flow control mechanism may be defined as mandatory and may be operated, for example, when at least one of the STAs, e.g., STA 302 and/or 340, does not support the enhanced flow control mechanism.

In one example, as discussed above, STA 340 may be allowed to transmit the maximum allowed A-MPDU length, which is 64 KB, for example, until STA 340 receives the first predefined value, e.g., RBUFCAP=0, in a responder Block Acks, e.g., Ack 330. According to this example, the originator STA 340 may stop its transmission in TXOP 306, for example, until a non-zero value, e.g., a positive value, is received in response to an Ack request, e.g., in Ack 324 in response to Ack request 332.

Referring back to FIG. 1, in some demonstrative embodiments device 102 and/or device 140 may be configured to communicate a third value, for example, in addition to the first value, which is to indicate the available memory size at the beginning of the TXOP, e.g., the maximal initial transmission length, and/or in addition to the second value, which is to indicate the maximal length of an A-MPDU transmission during the TXOP, e.g., the maximal transmission length, as described below.

In some demonstrative embodiments, device 102 and/or device 140 may be configured to communicate the third value, for example, in the buffer capacity field, e.g., the RBUFCAP field, of the ACK, e.g., as described below.

In some demonstrative embodiments, the third value may indicate that device 140 is to be allowed to send to device 102 the subsequent A-MPDU having a length which is not longer than the third value, e.g., as described below.

In some demonstrative embodiments, device 140 may receive the Ack from device 102 including the third value, e.g., in the RBUFCAP field, e.g., as described below.

In some demonstrative embodiments, device 140 may determine an allowed length of the subsequent A-MPDU, for example, based on the third value, e.g., as described below.

In some demonstrative embodiments, the third value may include a count value to indicate a count of memory units, e.g., as described below.

In one example, the count value may indicate a count of memory units, which may be associated with a "Memory Management Unit" field. In one example, the Memory Management Unit field may be advertised, for example, in an ADDBA, for example, per TID, e.g., as follows:

TABLE 1

| Flow Control IE Field | Value |
| --- | --- |
| Memory Management Unit | 2 KB, 4 KB, 8 KB, 16 KB |

In other embodiments, any other memory unit may be implemented and/or advertised or negotiated using any other field and/or message.

In some demonstrative embodiments, controller 154 may be configured to cause, trigger, and/or control the wireless communication station implemented by device 140 to determine the allowed length of the subsequent A-MPDU, for example, based on a product of the count value, e.g., the capacity value in the RBUFCAP field ("RBUFCAP"), and a memory unit size ("Memory Management Unit"), e.g., as described below.

In some demonstrative embodiments, for example, when the enhanced method is supported, a transmission size of an A-MPDU may be limited, e.g., as follows:

Transmission Size≤(RBUFCAP×Memory Management Unit)

For example, the allowed length of an A-MPDU may be 24 KB, for example, if the count value in the RBUFCAP field, includes the count value "3", and an advertised Memory Management Unit field, e.g., according to Table 1, includes the value of 8 KB.

In some demonstrative embodiments, controller 154 may be configured to cause, trigger, and/or control the wireless communication station implemented by device 140 to transmit to device 102 the subsequent A-MPDU having the length which is not longer than the capacity value indicated by the RBUFCAP, e.g., as described below.

In some demonstrative embodiments, controller 124 may be configured to cause, trigger, and/or control the wireless communication station implemented by device 102 to receive the subsequent A-MPDU having the length which is not longer than the capacity value, e.g., as described below.

In some demonstrative embodiments, controller 124 may be configured to cause, trigger, and/or control the wireless communication station implemented by device 102 to determine an updated capacity value, for example, based on an updated current available memory size at device 102, for example, after receipt of the subsequent A-MPDU having the length, which is not longer than the third value, e.g., as described below.

In some demonstrative embodiments, controller 124 may be configured to cause, trigger, and/or control the wireless communication station implemented by device 102 to transmit to device 140 a subsequent Ack to acknowledge the subsequent A-MPDU, e.g., as described below.

In some demonstrative embodiments, the subsequent Ack may include the updated capacity value, e.g., as described below.

In some demonstrative embodiments, controller 154 may be configured to cause, trigger, and/or control the wireless communication station implemented by device 140 to receive the subsequent Ack from device 102 to acknowledge receipt of the subsequent A-MPDU, e.g., as described below.

In some demonstrative embodiments, device 102 may be configured to communicate a capability indication with device 140, e.g., as described below.

In some demonstrative embodiments, the capability indication may indicate a capability of a STA to support the second flow control mechanism, e.g., the enhanced flow control mechanism, e.g., as described below.

In some demonstrative embodiments, controller 124 may be configured to cause, trigger, and/or control the wireless communication station implemented by device 102 to communicate with device 140 a capability indication to indicate that device 102 is capable to determine the third value, e.g., as described below.

In some demonstrative embodiments, controller 154 may be configured to cause, trigger, and/or control the wireless communication station implemented by device 140 to communicate with device 102 the capability indication to indicate that device 140 is capable to send the subsequent A-MPDU having the length, which is not longer than the third value, e.g., as described below.

In some demonstrative embodiments, the enhanced flow control mechanism may be implemented, for example, only if both devices 102 and 140 support the enhanced flow control mechanism.

In one example, an EDMG STA, e.g., device 102, may advertise a capability of the EDMG STA to support using of the enhance flow control mechanism, for example, in an EDMG Capability information element (IE). For example, usage of the enhanced flow control mechanism may be only if both devices 102 and 140 support usage of the flow control mechanism.

In some demonstrative embodiments, at least one receive memory of device 102 may be managed as a shared Receive (Rx) memory, e.g., as described below.

In one example, received traffic may be stored in a shared memory, which may be used for a plurality of TIDs, e.g., some TIDs or all TIDs.

In one example, the shared memory may be associated with a Best Effort (BE) traffic Access Category (AC).

In some demonstrative embodiments, at least one receive memory of device 102 may be managed as a dedicated memory, e.g., as described below.

In one example, received traffic may be stored in a dedicated memory allocated only for a respective TID.

In one example, the dedicated memory may be allocated for received traffic associated with a QoS-Traffic AC.

In some demonstrative embodiments, a responder STA, e.g., device 102, may be configured to inform an originator STA, e.g., device 140, whether a TID is associated with a shared memory or a dedicated memory, for example, via an ADDBA Response. In other embodiments, the responder STA may be configured to inform the originator STA and/or negotiate with the initiator STA whether a TID is to associated with a shared memory or a dedicated memory, for example, via any other message or mechanism.

In some demonstrative embodiments, device 102 may be configured to set the capacity value in the buffer capacity field of the Ack to correspond to a current available memory of a shared memory, which is shared between a plurality of TIDs, e.g., as described below.

In some demonstrative embodiments, controller 154 may be configured to cause, trigger, and/or control the wireless communication station implemented by device 140 to transmit a subsequent A-MPDU having a length which is not longer than the capacity value, for example, when the subsequent A-MPDU corresponds to a TID of the plurality of the TIDs to which the capacity value corresponds, e.g., as described below.

In some demonstrative embodiments, device 102 may determine the current available memory size, for example, based on the shared memory e.g., as described below.

In some demonstrative embodiments, controller 124 may be configured to cause, trigger, and/or control the wireless communication station implemented by device 102 to determine the current available memory size of the shared memory, e.g., at device 102, based on the shared memory, which may be shared between at least first and second TIDs, e.g., as described below.

In some demonstrative embodiments, controller 124 may be configured to cause, trigger, and/or control the wireless communication station implemented by device 102 to receive from device 140 a first A-MPDU corresponding to the first TID and a second A-MPDU corresponding to the second TID, e.g., as described below.

In some demonstrative embodiments, controller 124 may be configured to cause, trigger, and/or control the wireless communication station implemented by device 102 to update the current available memory size of the shared memory based on a length of the first A-MPDU and a length of the second A-MPDU, e.g., as described below.

In some demonstrative embodiments, device 102 may be configured to set the capacity value in the buffer capacity field of the Ack to correspond to a current available memory of a dedicated memory, which is dedicated to a TID, e.g., as described below.

In some demonstrative embodiments, controller 154 may be configured to cause, trigger, and/or control the wireless communication station implemented by device 140 to transmit a subsequent A-MPDU having the length which is not longer than the capacity value, when the subsequent A-MPDU corresponds to the TID, e.g., as described below.

In some demonstrative embodiments, device 102 may determine the current available memory size, for example, based on the dedicated memory, e.g., as described below.

In some demonstrative embodiments, controller 124 may be configured to cause, trigger, and/or control the wireless communication station implemented by device 102 to determine the current available memory size based on the dedicated memory, which is dedicated to a TID, e.g., as described below.

In some demonstrative embodiments, controller 124 may be configured to cause, trigger, and/or control the wireless communication station implemented by device 102 to update the current available memory size of the dedicated memory, for example, based on a length of an A-MPDU corresponding to the TID, e.g., as described below.

In some demonstrative embodiments, device 102 may be configured to communicate one or more A-MPDUs with device 140, for example, when device 102 utilizes a shared memory, e.g., as describes below.

In one example, since the shared memory may serve one or more Receiver addresses (RA) and/or TIDs, there may be a relatively high probability that the shared memory may be occupied in a start of a TXOP. According to this example, an EDMG STA, e.g., device 102, may be configured to advertise the first value, e.g., the maximal initial transmission length (also referred to as "Flow Control Max A-MPDU size"), to indicate the available memory size at the STA at the beginning of the TXOP, for example, to indicate the maximum size of transmission that may be sent when the capacity value in the RBUFCAP field is unknown.

In some demonstrative embodiments, the first value, e.g., the maximal initial transmission length, may be advertized in an EDMG Capability IE. In other embodiments, the first value to indicate the available memory size at the STA at the beginning of the TXOP may be advertized in any other IE, message, and/or frame.

In some demonstrative embodiments, every new TXOP should be started with an initial A-MPDU having a size, which is not greater than the Flow Control Max A-MPDU size value, e.g., advertized in the EDMG Capability IE.

In some demonstrative embodiments, the first value to indicate the available memory size at the STA at the beginning of the TXOP may be less than or equal to the second value, which indicates the maximal length of an A-MPDU transmission during the TXOP, for example, as follows:

$$0 \leq \text{Flow Control Max A-MPDU size} \leq \text{maximal transmission length of A-MPDU that the STA can receive}$$

In some demonstrative embodiments, an originator STA, e.g., device 140, may perform one or more operations and/or may follow one or more rules, for example, when a TID of an A-MPDU is associated with a shared memory, e.g., as described below.

In some demonstrative embodiments, the originator STA, e.g., device 140, may be configured to determine that a received capacity value, e.g., in the RBUFCAP field, is to be valid for all TIDs associated with the shared memory.

In some demonstrative embodiments, the originator STA may transmit the initial A-MPDU having a length, which is not longer than the Flow Control Max A-MPDU size, for example, when the received capacity value, e.g., in the RBUFCAP field, is not known.

In some demonstrative embodiments, the originator STA, e.g., device 140, may be configured to determine that the received capacity value, e.g., in the RBUFCAP field, may be valid only within a TXOP, e.g., its value may expire for a subsequent TXOP.

In some demonstrative embodiments, an originator STA, e.g., device 140, may perform one or more operations and/or may follow one or more rules, for example, when a TID of an A-MPDU is associated with a dedicated memory, e.g., as described below.

In some demonstrative embodiments, the originator STA, e.g., device 140, may be configured to determine that a received capacity value, e.g., in the RBUFCAP field, is to be valid only for a respective Receiver Address (RA), Transmitter Address (TA), and/or TID traffic corresponding to the dedicated memory.

In some demonstrative embodiments, for example, for every first transmission of a dedicated TID, the originator may send an A-MPDU having a size, which is a maximum between a last received capacity value, e.g., in the RBUFCAP field, and a Flow Control Max A-MPDU size.

In some demonstrative embodiments, the capacity value in the buffer capacity field, e.g., the RBUFCAP field, may be added, for example, for every TID, e.g., in a Multi-TID BlockAck variant.

In some demonstrative embodiments, a TID RBUFCAP representation of the capacity value in the buffer capacity field, e.g., corresponding to a shared memory or a dedicated memory, and/or a memory management unit size, may be according to a respective TID ADDBA agreement.

Figure 4:
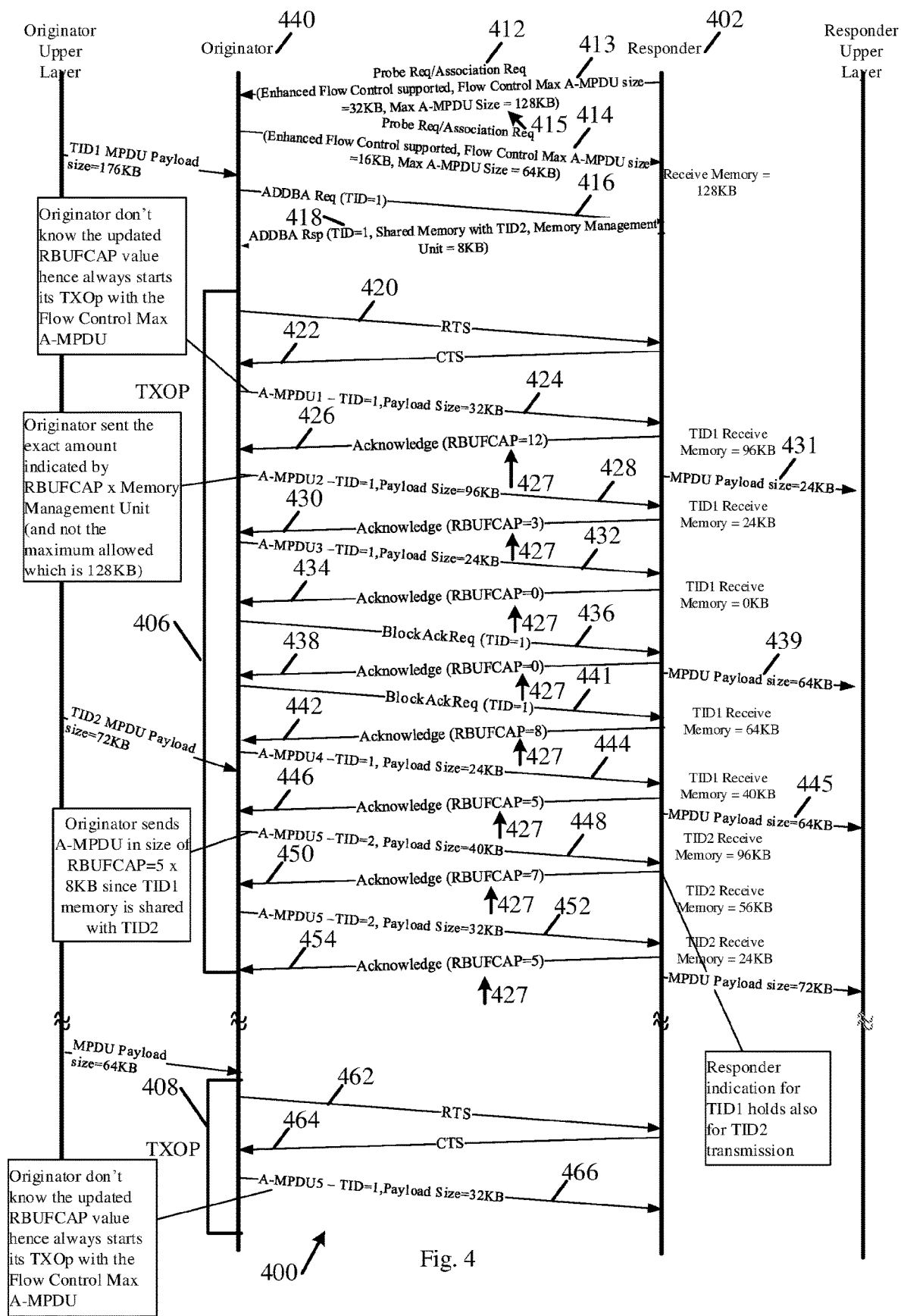
FIG. 4 is a schematic illustration of a diagram of operations and communications between an originator STA and a responder STA, in accordance with some demonstrative embodiments.

Reference is made to FIG. 4, which schematically illustrates a diagram 400 of operations and communications between an originator STA 440 and a responder STA 402, in accordance with some demonstrative embodiments.

In one example, device 102 (FIG. 1) may be configured to perform one or more of the operations of, the role of, and/or one or more functionalities of, responder STA 402; and/or device 140 (FIG. 1) may be configured to perform one or more of the operations of, the role of, and/or one or more functionalities of, originator STA 440.

In some demonstrative embodiments, one or more of the operations and communications of diagram 400 may be performed, for example, according to the second flow control mechanism, for example, the enhanced flow control mechanism, e.g., as described below.

In some demonstrative embodiments, STA 402 may include a shared memory, which may be shared between at least first and second TIDs, for example, a TID1 and a TID2, e.g., as described below.

In some demonstrative embodiments, as shown in FIG. 4, STA 402 may transmit a message 412 to STA 440.

In some demonstrative embodiments, as shown in FIG. 4, message 412 may include a probe request or an association request.

In some demonstrative embodiments, as shown in FIG. 4, message 412 may include a first field 413 including a first value, for example, the maximal initial transmission length, e.g., 32 KB, to indicate an available memory size, e.g., a minimal obligated available memory size, at STA 402 at a beginning of a TXOP 406.

In some demonstrative embodiments, as shown in FIG. 4, message 412 may include a second field 415 including a second value, for example, the maximal transmission length, e.g., 128 KB, to indicate a maximal length of an A-MPDU transmission during the TXOP 406.

In some demonstrative embodiments, as shown in FIG. 4, STA 440 may transmit to STA 440 a message 414, e.g., including the first field 413 and the second field 415.

In some demonstrative embodiments, as shown in FIG. 4, message 414 may include a probe response or an association response. In other embodiments, messages 412 and/or 414 may include any other type of messages.

In some demonstrative embodiments, as shown in FIG. 4, messages 412 and 414 may include an indication ("Enhanced flow control") to indicate that an enhanced flow control mechanism is supported. Accordingly, the STA 402 and 440 may select to implement the enhanced flow control mechanism, e.g., as described below.

In some demonstrative embodiments, as shown in FIG. 4, STA 402 and STA 440 may exchange an ADDBA request 416 and an ADDBA response 418, for example, to establish an ADDBA agreement between STA 402 and 440.

In some demonstrative embodiments, as shown in FIG. 4, ADDBA response 418 may include an indication of the shared memory, which is shared between TID1 and TID2, and an indication of a memory management unit size, e.g., 8 KB.

In some demonstrative embodiments, as shown in FIG. 4, an available memory size of STA 402 at the beginning of TXOP 406 may be 128 KB.

In some demonstrative embodiments, as shown in FIG. 4, STA 402 and STA 440 may exchange an RTS 420 and a CTS 422, for example, to establish TXOP 406. In other embodiments, the TXOP 406 may be established according to any other mechanism and/or message exchange, e.g., using a grant frame or any other message.

In some demonstrative embodiments, as shown in FIG. 4, STA 440 may transmit to STA 402 an initial A-MPDU 424 of the TID1, e.g., having a length of 32 KB.

In some demonstrative embodiments, as shown in FIG. 4, the length of the initial A-MPDU 424 may not be longer than the first value, for example, not longer than the maximal initial transmission length, which may be equal to 32 KB, for example, since STA 440 may not be aware of the current available memory size at STA 402.

In some demonstrative embodiments, as shown in FIG. 4, after receipt of initial A-MPDU 424, an available memory size of the shared memory at STA 402 may be 96 KB, for example, 128 KB−32 KB=96 KB.

In some demonstrative embodiments, as shown in FIG. 4, STA 402 may transmit to STA 402 an Ack 426 to acknowledge the initial A-MPDU 424.

In some demonstrative embodiments, as shown in FIG. 4, Ack 426 may include an RBUFCAP field 427 including a third value to indicate that STA 440 is to be allowed to send STA 402 a subsequent A-MPDU 428, e.g., of the TID1 or TID2, having a length which is not longer than the third value.

In some demonstrative embodiments, as shown in FIG. 4, the third value may include a count value, e.g., "12", to indicate a count of memory management units.

In one example, STA 402 may set the third value to 12, for example, to allow a transmission size, which is not longer than 96 KB, e.g., 8 KB×12=96 KB, since the current available memory size of the shared memory, after receipt of initial A-MPDU 424, is 96 KB.

In some demonstrative embodiments, as shown in FIG. 4, STA 402 may transfer data 431 having a size of 24 KB to an upper layer of STA 402.

In some demonstrative embodiments, as shown in FIG. 4, STA 440 may transmit to STA 402 an A-MPDU 428, e.g., of the TID1, having a length of 96 KB.

In some demonstrative embodiments, as shown in FIG. 4, the available memory size of the shared memory after receipt of A-MPDU 428 may be 24 KB, for example, 96 KB+24 KB−96 KB=24 KB.

In some demonstrative embodiments, as shown in FIG. 4, STA 402 may transmit an Ack 430 to STA 402 to acknowledge the A-MPDU 428.

In some demonstrative embodiments, as shown in FIG. 4, Ack 430 may include an RBUFCAP field 427 including the count value "3" to indicate that STA 440 is allowed to send to STA 402 a subsequent A-MPDU, e.g., of the TID1 or TID2, having a length which is not longer than 24 KB, e.g., 3×8 KB=24 KB.

In one example, STA 402 may set the value of RBUFCAP field 427 to "3", for example, to allow a transmission size, which is no longer than 24 KB, since the current available memory size of the shared memory, after receipt of A-MPDU 428, is 24 KB.

In some demonstrative embodiments, as shown in FIG. 4, STA 440 may transmit to STA 402 an A-MPDU 432, e.g., of the TID1, having a length of 24 KB.

In some demonstrative embodiments, as shown in FIG. 4, the available memory size of the shared memory after receipt of A-MPDU 432 may be 0 KB, for example, 24 KB−24 KB=0 KB.

In some demonstrative embodiments, as shown in FIG. 4, STA 402 may transmit an Ack 434 to STA 402 to acknowledge the A-MPDU 432.

In some demonstrative embodiments, as shown in FIG. 4, Ack 430 may include an RBUFCAP field 427 including the count value "0", to indicate that STA 440 is not allowed to send a subsequent A-MPDU, e.g., of TID1 or TID2, to STA 402.

In one example, STA 402 may set the count value to 0, for example, since the current available memory size of the shared memory after receipt of A-MPDU 432 is 0 KB.

In some demonstrative embodiments, as shown in FIG. 4, STA 440 may transmit an Ack request 436 to STA 402, for example, to request to transmit a subsequent A-MPDU, e.g., of the TID1.

In some demonstrative embodiments, as shown in FIG. 4, STA 402 may transmit to STA 402 an Ack 438 to acknowledge the Ack request 436.

In some demonstrative embodiments, as shown in FIG. 4, Ack 438 may include an RBUFCAP field 427 including the count value "0", to indicate that STA 440 is not allowed to send a subsequent A-MPDU to STA.

In one example, STA 402 may set the count value to "0", for example, since the current available memory size of the shared memory after receipt of Ack request 436 is 0 KB.

In some demonstrative embodiments, as shown in FIG. 4, STA 402 may transfer data 439 having a size of 64 KB to an upper layer of STA 402.

In some demonstrative embodiments, as shown in FIG. 4, the available memory size of the shared memory after the transfer of data 439 may be 64 KB, for example, 0+64 KB=64 KB.

In some demonstrative embodiments, as shown in FIG. 4, STA 440 may transmit an Ack request 441 to STA 402, for example, to request to transmit the subsequent A-MPDU, e.g., of the TID1.

In some demonstrative embodiments, as shown in FIG. 4, STA 402 may transmit to STA 402 an Ack 442 to acknowledge the Ack request 441.

In some demonstrative embodiments, as shown in FIG. 4, Ack 442 may include an RBUFCAP field 427 including the count value "8" to indicate that STA 440 is allowed to send to STA 402 a subsequent A-MPDU, e.g., of the TID1 or TID2, having a length which is not longer than 64 KB, e.g., 8×8 KB=64 KB.

In some demonstrative embodiments, as shown in FIG. 4, STA 440 may transmit an A-MPDU 444, e.g., of the TID1, having a length of 24 KB to STA 402.

In some demonstrative embodiments, as shown in FIG. 4, the available memory size of the shared memory after receipt of A-MPDU 444 may be 40 KB, for example, 64 KB−24 KB=40 KB.

In some demonstrative embodiments, as shown in FIG. 4, STA 402 may transmit an Ack 446 to STA 402 to acknowledge the A-MPDU 444.

In some demonstrative embodiments, as shown in FIG. 4, Ack 446 may include an RBUFCAP field 427 including the count value "5" to indicate that STA 440 is allowed to send a subsequent A-MPDU to STA 402 having a length which is not longer than 40 KB, e.g., 5×8 KB=40 KB.

In some demonstrative embodiments, as shown in FIG. 4, STA 402 may transfer data 445 having a size of 64 KB to an upper layer of STA 402.

In some demonstrative embodiments, as shown in FIG. 4, STA 440 may transmit to STA 402 an A-MPDU 448, e.g., of the TID2, having a length of 40 KB.

In some demonstrative embodiments, as shown in FIG. 4, the STA 40-2 may be allowed to send the A-MPDU 448 corresponding to TID2, for example, since the available memory size is shared between TID1 and TID2, and the RBUFCAP field 427 including the count value "5" may be relevant for transmissions of A-MPDUs corresponding to TID1 and/or transmissions of A-MPDUs corresponding to TID2.

In some demonstrative embodiments, as shown in FIG. 4, the available memory size of the shared memory after receipt of A-MPDU 448 may be 56 KB, for example, 96 KB−40 KB=56 KB.

In some demonstrative embodiments, as shown in FIG. 4, STA 402 may transmit an Ack 450 to STA 402 to acknowledge the A-MPDU 448.

In some demonstrative embodiments, as shown in FIG. 4, Ack 450 may include an RBUFCAP field 427 including the count value 7 to indicate that STA 440 is allowed to send to STA 402 a subsequent A-MPDU, e.g., corresponding to TID1 or to TID2, and having a length, which is not longer than 56 KB, e.g., 7×8 KB=56 KB.

In one example, STA 402 may set the count value to 7, for example, to allow a transmission size, which is no longer than 56 KB, since the current available memory size, which is shared between TID1 and TID2, is 56 KB.

In some demonstrative embodiments, as shown in FIG. 4, STA 440 may transmit to STA 402 an A-MPDU 452 having a length of 32 KB.

In some demonstrative embodiments, as shown in FIG. 4, A-MPDU 452 may correspond to TID2.

Figure 5:
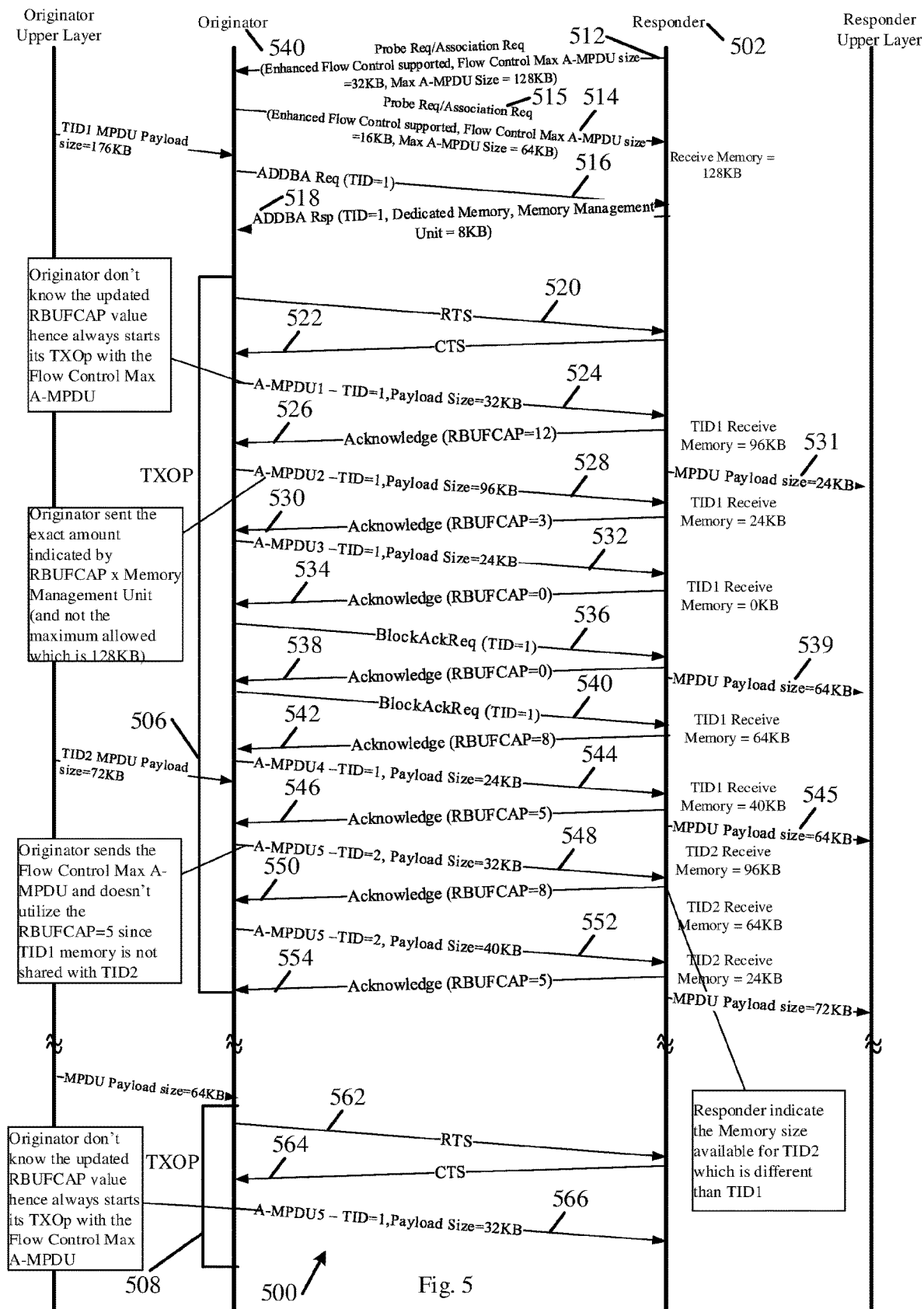
FIG. 5 is a schematic illustration of a diagram of operations and communications between an originator STA and a responder STA, in accordance with some demonstrative embodiments.

In some demonstrative embodiments, as shown in FIG. 5, the available memory size, which is shared between TID1 and TID2, after receipt of A-MPDU 452, may be 24 KB, for example, 64 KB−40 KB=24 KB.

In some demonstrative embodiments, as shown in FIG. 4, STA 402 may transmit an Ack 454 to STA 402 to acknowledge the A-MPDU 452.

In some demonstrative embodiments, as shown in FIG. 4, STA 402 and STA 440 may exchange an RTS 462 and a CTS 464, for example, to establish a subsequent TXOP 408.

In some demonstrative embodiments, as shown in FIG. 4, STA 440 may transmit an initial A-MPDU 466 of the TXOP 408 to STA 402.

In some demonstrative embodiments, as shown in FIG. 4, a length of the initial A-MPDU 466 may not be longer than the first value, for example, not longer than the maximal initial transmission length, which may be equal to 32 KB, for example, since STA 440 may not be aware of the current available memory size at STA 402 in TXOP 408.

In some demonstrative embodiments, diagram 400 may demonstrate a scenario in which the enhanced flow control mechanism may be utilized over a shared memory, which is shared between the TID1 and TID2. For example, STA 402 and 440 may select to utilize the enhanced flow control, for example, based on the exchange of the indication that both of the STAs, e.g., STA 402 and 440, support the enhanced flow control mechanism.

In one example, as shown in FIG. 4, STA 440 may transmit A-MPDUs having a size, which is limited by the count value in the RBUFCAP field 427, which may allow STA 402 to manage its shared memory more efficiently. Since the shared memory is shared for both TID1 and TID2, the count value in the RBUFCAP field 427, which may be reported for TID1, may be valid for TID2 transmissions.

In one example, as shown in FIG. 4, STA 440 may transmit an initial A-MPDU in a TXOP, e.g., A-MPDUs 424 and/or 426, having a length, which is no longer than the first flow control value in field 413.

Reference is made to FIG. 5, which schematically illustrates a diagram 500 of operations and communications between an originator STA 540 and a responder STA 502, in accordance with some demonstrative embodiments.

In one example, device 102 (FIG. 1) may be configured to perform one or more of the operations of, the role of, and/or one or more functionalities of, responder STA 502; and/or device 140 (FIG. 1) may be configured to perform one or more of the operations of, the role of, and/or one or more functionalities of, originator STA 540.

In some demonstrative embodiments, one or more of the operations and communications of diagram 500 may be performed, for example, according to the second flow control mechanism, for example, the enhanced flow control mechanism, e.g., as described below.

In some demonstrative embodiments, STA 502 may include a first dedicated memory ("Dedicated TID1 memory"), which may dedicated to a first TID, for example, a TID1, and a second dedicated memory ("Dedicated TID2 memory"), which may dedicated to a second TID, for example, a TID2, e.g., as described below.

In some demonstrative embodiments, as shown in FIG. 5, STA 502 may transmit a message 512 to STA 540.

In some demonstrative embodiments, as shown in FIG. 5, message 512 may include a probe request or an association request.

In some demonstrative embodiments, as shown in FIG. 5, message 512 may include a first field 513 including a first value, for example, the maximal initial transmission length, e.g., 32 KB, to indicate an available memory size, e.g., a minimal obligated available memory size, at STA 502 at a beginning of a TXOP 506.

In some demonstrative embodiments, as shown in FIG. 5, message 512 may include a second field 515 including a second value, for example, the maximal transmission length, e.g., 128 KB, to indicate a maximal length of an A-MPDU transmission during the TXOP 506.

In some demonstrative embodiments, as shown in FIG. 5, STA 540 may transmit to STA 540 a message 514, e.g., including the first field 513 and the second field 515.

In some demonstrative embodiments, as shown in FIG. 5, message 514 may include a probe response or an association response. In other embodiments, messages 512 and/or 514 may include any other type of messages.

In some demonstrative embodiments, as shown in FIG. 5, messages 512 and 514 may include an indication ("Enhanced flow control") to indicate that an enhanced flow control mechanism is supported. Accordingly, the STA 502 and 540 may select to implement the enhanced flow control mechanism, e.g., as described below.

In some demonstrative embodiments, as shown in FIG. 5, STA 502 and STA 540 may exchange an ADDBA request 516 and an ADDBA response 518, for example, to establish an ADDBA agreement between STA 502 and 540.

In some demonstrative embodiments, as shown in FIG. 5, ADDBA response 518 may include an indication of the dedicated memory dedicated to TID1, and an indication of memory management unit size, e.g., 8 KB.

In some demonstrative embodiments, as shown in FIG. 5, an available memory size of the dedicated TID1 memory of STA 502 at the beginning of TXOP 506 may be 128 KB.

In some demonstrative embodiments, as shown in FIG. 5, STA 502 and STA 540 may exchange an RTS 520 and a CTS 522, for example, to establish TXOP 506.

In other embodiments, the TXOP 506 may be established according to any other mechanism and/or message exchange, e.g., using a grant frame or any other message.

In some demonstrative embodiments, as shown in FIG. 5, STA 540 may transmit to STA 502 an initial A-MPDU 524 of the TID1, e.g., having a length of 32 KB.

In some demonstrative embodiments, as shown in FIG. 5, the length of the initial A-MPDU 524 may not be longer than the first value, for example, not longer than the maximal initial transmission length, which may be equal to 32 KB, for example, since STA 540 may not be aware of the current available memory size at STA 502.

In some demonstrative embodiments, as shown in FIG. 5, after receipt of initial A-MPDU 524, an available memory size of the dedicated TID1 memory of STA 502 may be 96 KB, for example, 128 KB−32 KB=96 KB.

In some demonstrative embodiments, as shown in FIG. 5, STA 502 may transmit to STA 502 an Ack 526 to acknowledge the initial A-MPDU 524.

In some demonstrative embodiments, as shown in FIG. 5, Ack 526 may include an RBUFCAP field 527 including a third value to indicate that STA 540 is to be allowed to send STA 502 a subsequent A-MPDU 528 of the TID1 having a length which is not longer than the third value.

In some demonstrative embodiments, as shown in FIG. 5, the third value may include a count value, e.g., "12", to indicate a count of memory management units.

In one example, STA 502 may set the third value to 12, for example, to allow a transmission size, which is no longer than 96 KB, e.g., 8 KB×12=96 KB, since the current available memory size of the dedicated TID1 memory, after receipt of initial A-MPDU 524, is 96 KB.

In some demonstrative embodiments, as shown in FIG. 5, STA 502 may transfer data 531 having a size of 24 KB to an upper layer of STA 502.

In some demonstrative embodiments, as shown in FIG. 5, STA 540 may transmit to STA 502 an A-MPDU 528 of the TID1 having a length of 96 KB.

In some demonstrative embodiments, as shown in FIG. 5, the available memory size of the dedicated TID1 memory after receipt of A-MPDU 528 may be 24 KB, for example, 96 KB+24 KB−96 KB=24 KB.

In some demonstrative embodiments, as shown in FIG. 5, STA 502 may transmit an Ack 530 to STA 502 to acknowledge the A-MPDU 528.

In some demonstrative embodiments, as shown in FIG. 5, Ack 530 may include an RBUFCAP field 527 including the count value "3" to indicate that STA 540 is allowed to send to STA 502 a subsequent A-MPDU of the TID1 having a length which is not longer than 24 KB, e.g., 3×8 KB=24 KB.

In one example, STA 502 may set the third value to "3", for example, to allow a transmission size, which is no longer than 24 KB, since the current available memory size of the dedicated TID1 memory, e.g., after receipt of A-MPDU 528, is 24 KB.

In some demonstrative embodiments, as shown in FIG. 5, STA 540 may transmit to STA 502 an A-MPDU 532 of the TID1 having a length of 24 KB.

In some demonstrative embodiments, as shown in FIG. 5, the available memory size of the dedicated TID1 memory after receipt of A-MPDU 532 may be 0 KB, for example, 24 KB−24 KB=0 KB.

In some demonstrative embodiments, as shown in FIG. 5, STA 502 may transmit an Ack 534 to STA 502 to acknowledge the A-MPDU 532.

In some demonstrative embodiments, as shown in FIG. 5, Ack 530 may include an RBUFCAP field 527 including the count value "0", to indicate STA 540 is not allowed to send to the STA 502 a subsequent A-MPDU of the TID1.

In one example, STA 502 may set the count value to 0, for example, since the current available memory size of the dedicated TID1 memory after receipt of A-MPDU 532 is 0 KB.

In some demonstrative embodiments, as shown in FIG. 5, STA 540 may transmit an Ack request 536 to STA 502, for example, to request to transmit a subsequent A-MPDU of the TID1.

In some demonstrative embodiments, as shown in FIG. 5, STA 502 may transmit to STA 502 an Ack 538 to acknowledge the Ack request 536.

In some demonstrative embodiments, as shown in FIG. 5, Ack 538 may include an RBUFCAP field 527 including the count value "0", to indicate STA 540 is not allowed to send to STA 540 a subsequent A-MPDU of the TID1.

In one example, STA 502 may set the count value to "0", for example, since the current available memory size of the dedicated TID1 memory after receipt of Ack request 536 is 0 KB.

In some demonstrative embodiments, as shown in FIG. 5, STA 502 may transfer data 539 of the TID1 having a size of 64 KB to an upper layer of STA 502.

In some demonstrative embodiments, as shown in FIG. 5, the available memory size of the dedicated TID1 memory after the transfer of data 539 may be 64 KB, for example, 0+64 KB=64 KB.

In some demonstrative embodiments, as shown in FIG. 5, STA 540 may transmit an Ack request 541 to STA 502, for example, to request to transmit a subsequent A-MPDU of the TID1.

In some demonstrative embodiments, as shown in FIG. 5, STA 502 may transmit to STA 502 an Ack 542 to acknowledge the Ack request 540.

In some demonstrative embodiments, as shown in FIG. 5, Ack 542 may include an RBUFCAP field 527 including the count value "8" to indicate that STA 540 is allowed to send to STA 502 a subsequent A-MPDU of the TID1 having a length which is not longer than 64 KB, e.g., 8×8 KB=64 KB.

In some demonstrative embodiments, as shown in FIG. 5, STA 540 may transmit to STA 502 an A-MPDU 544 of the TID1 having a length of 24 KB.

In some demonstrative embodiments, as shown in FIG. 5, the available memory size of the dedicated TID1 memory after receipt of A-MPDU 544 may be 40 KB, for example, 64 KB−24 KB=40 KB.

In some demonstrative embodiments, as shown in FIG. 5, STA 502 may transmit an Ack 546 to STA 502 to acknowledge the A-MPDU 544.

In some demonstrative embodiments, as shown in FIG. 5, Ack 546 may include an RBUFCAP field 527 including the count value "5" to indicate that STA 540 is allowed to send to STA 502 a subsequent A-MPDU of the TID1 having a length which is not longer than 50 KB, e.g., 5×8 KB=50 KB.

In some demonstrative embodiments, as shown in FIG. 5, STA 502 may transfer data 545 of the TID1 having a size of 64 KB to an upper layer of STA 502.

In some demonstrative embodiments, as shown in FIG. 5, STA 540 may transmit to STA 502 an A-MPDU 548 having a length of 32 KB.

In some demonstrative embodiments, as shown in FIG. 5, A-MPDU 548 may correspond to TID2.

In some demonstrative embodiments, since the available memory size indicated by the RBUFCAP field 527 dedicated to TID1, STA 540 is not allowed to use the count value "5" in the RBUFCAP field 527 for transmissions of A-MPDUs not corresponding to TID1.

In some demonstrative embodiments, as shown in FIG. 5, STA 540 may be allowed to transmit A-MPDU 548, which corresponds to TID2, with a length, which is no longer than the first value, for example, not longer than the maximal initial transmission length, which may be equal to 32 KB, for example, since STA 540 may not be aware of the current available memory size of the dedicated TID2 memory at STA 402.

In some demonstrative embodiments, as shown in FIG. 5, STA 502 may transmit an Ack 550 to STA 502 to acknowledge the A-MPDU 548.

In some demonstrative embodiments, as shown in FIG. 5, Ack 550 may include an RBUFCAP field 527 including a count value "8", which corresponds to the dedicated TID2 memory.

In some demonstrative embodiments, the count value "8" may indicate that STA 540 is allowed to send to STA 502 a subsequent A-MPDU corresponding to TID2 and having a length which is not longer than 64 KB, e.g., 8×8 KB=64 KB.

In one example, STA 502 may set the count value to 8, for example, to allow a transmission size, which is no longer than 64 KB, since the available memory size, which is dedicated to TID2, is 64 KB.

In some demonstrative embodiments, as shown in FIG. 5, STA 540 may transmit to STA 502 an A-MPDU 552 having a length of 40 KB.

In some demonstrative embodiments, as shown in FIG. 5, A-MPDU 552 may correspond to TID2.

In some demonstrative embodiments, as shown in FIG. 5, the available memory size, which is dedicated to TID2, after receipt of A-MPDU 552, may be 24 KB, for example, 64 KB−40 KB=24 KB.

In some demonstrative embodiments, as shown in FIG. 5, STA 502 may transmit an Ack 554 to STA 502 to acknowledge the A-MPDU 550.

In some demonstrative embodiments, as shown in FIG. 5, STA 502 and STA 540 may exchange an RTS 562 and a CTS 564, for example, to establish a subsequent TXOP 508.

In some demonstrative embodiments, as shown in FIG. 5, STA 540 may transmit to STA 502 an initial A-MPDU 566 of the TID1 in the TXOP 508.

In some demonstrative embodiments, as shown in FIG. 5, a length of the initial A-MPDU 566 may not be longer than the first value for example, not longer than the maximal initial transmission length, which may be equal to 32 KB, for example, since STA 540 may not be aware of the current available memory size of the dedicated TID1 memory at STA 502.

In some demonstrative embodiments, diagram 500 may demonstrate a scenario in which the enhanced flow control mechanism may be utilized over dedicated memories, which are each dedicated for the TID1 and TID2. For example, STA 502 and 540 may select to utilize the enhanced flow control, for example, based on the exchange of the indication that both of the STAs, e.g., STA 502 and 540, support the enhanced flow control mechanism.

In one example, as shown in FIG. 5, STA 540 may transmit A-MPDUs having a size, which is limited by the count value in the RBUFCAP field 527, which may allow STA 502 to manage its dedicated memory more efficiently. Since the dedicated memory is dedicated to TID1, the count value in the RBUFCAP field 527, which may be reported for TID1, may not be valid for TID2 transmissions. Therefore, STA 540 may transmit an initial A-MPDU corresponding to TID2, with a length, which is no longer than the first flow control value, e.g., the maximal initial transmission size.

In one example, as shown in FIG. 5, STA 540 may transmit an initial A-MPDU, e.g., A-MPDUs 524 and/or 526, having a length, which is no longer than a maximum between the first value in field 513 and the last count value in the RBUFCAP field 527, which corresponds to a same TID.

Figure 6:
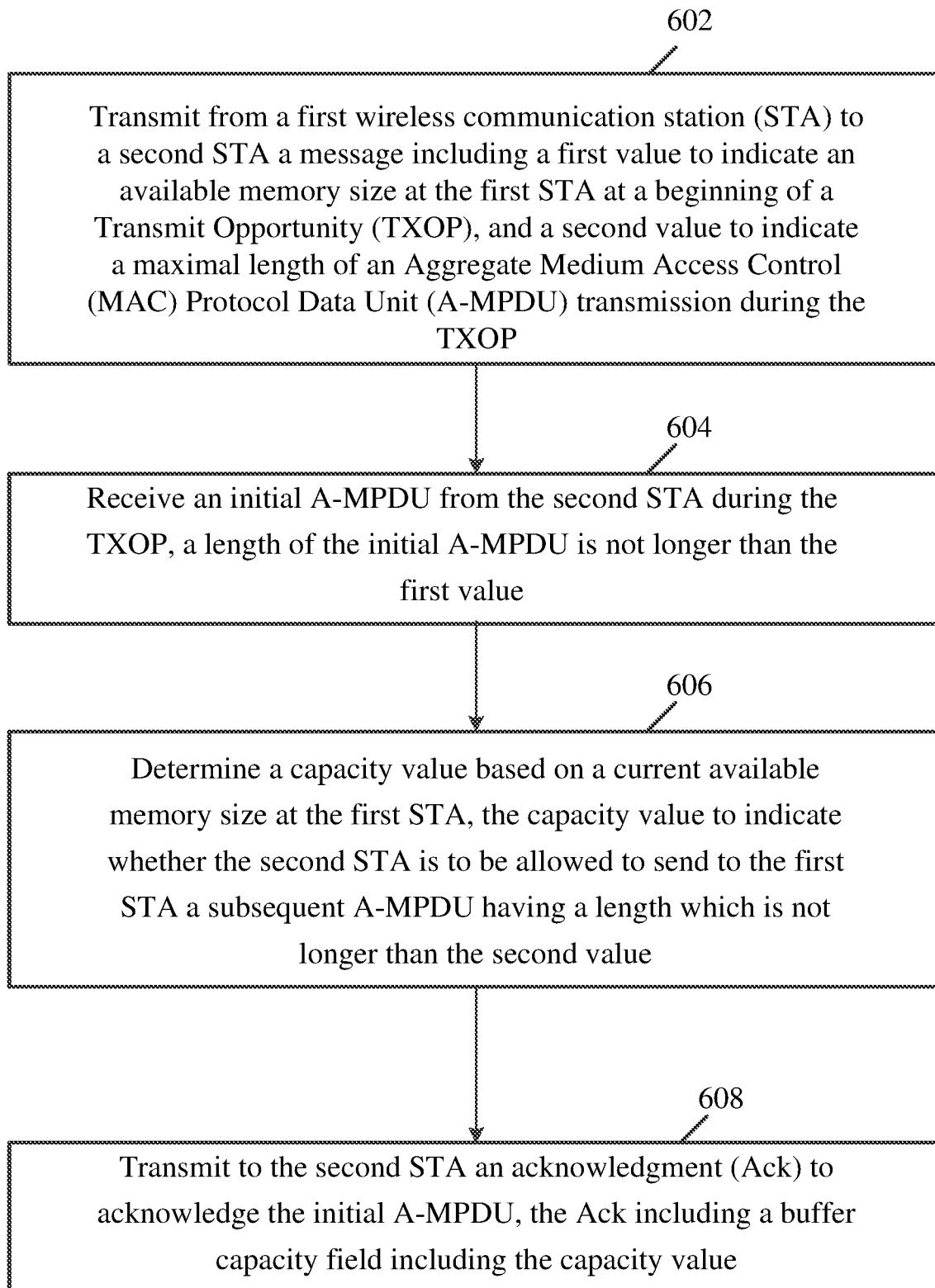
FIG. 6 is a schematic flow-chart illustration of a method of communication during a Transmit Opportunity (TXOP), in accordance with some demonstrative embodiments.

Reference is made to FIG. 6, which schematically illustrates a method of communication during a TXOP, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include transmitting from a first STA to a second STA a message including a first value to indicate an available memory size at the first STA at a beginning of a TXOP, and a second value to indicate a maximal length of an A-MPDU transmission during the TXOP. For example, controller 124 (FIG. 1) may be configured to cause, trigger, and/or control the wireless communication station implemented by device 102 (FIG. 1) to transmit to device 140 (FIG. 1) the message including the first value to indicate the available memory size at device 102 (FIG. 1) at the beginning of the TXOP, and the second value to indicate the maximal length of an A-MPDU transmission during the TXOP, e.g., as described above.

As indicated at block 604, the method may include receiving an initial A-MPDU from the second STA during the TXOP, a length of the initial A-MPDU is not longer than the first value. For example, controller 124 (FIG. 1) may be configured to cause, trigger, and/or control the wireless communication station implemented by device 102 (FIG. 1) to receive the initial A-MPDU from device 140 (FIG. 1) during the TXOP, the length of the initial A-MPDU nay be not longer than the first value, e.g., as described above.

As indicated at block 606, the method may include determining a capacity value based on a current available memory size at the first STA, the capacity value to indicate whether the second STA is to be allowed to send to the first STA a subsequent A-MPDU having a length which is not longer than the second value. For example, controller 124 (FIG. 1) may be configured to cause, trigger, and/or control the wireless communication station implemented by device 102 (FIG. 1) to determine the capacity value based on the current available memory size at device 102 (FIG. 1), the capacity value to indicate whether the device 140 (FIG. 1) is to be allowed to send to device 102 (FIG. 1) the subsequent A-MPDU having the length which is not longer than the second value, e.g., as described above.

As indicated at block 608, the method may include transmitting to the second STA an Ack to acknowledge the initial A-MPDU, the Ack including a buffer capacity field including the capacity value. For example, controller 124 (FIG. 1) may be configured to cause, trigger, and/or control the wireless communication station implemented by device 102 (FIG. 1) to transmit to device 140 (FIG. 1) the Ack to acknowledge the initial A-MPDU, the Ack including the buffer capacity field including the capacity value, e.g., as described above.

Figure 7:
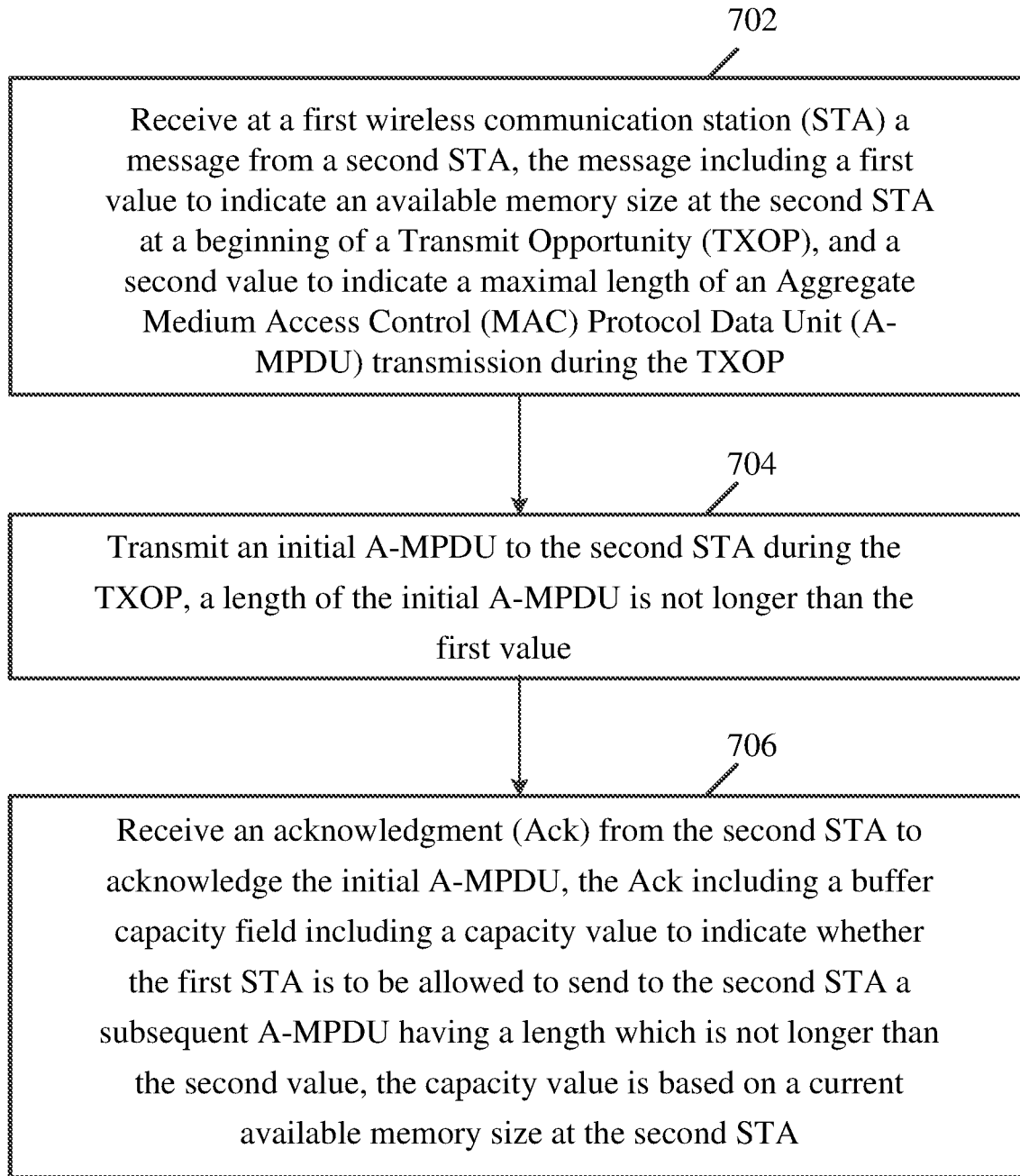
FIG. 7 is a schematic flow-chart illustration of a method of communication during a TXOP, in accordance with some demonstrative embodiments.

Reference is made to FIG. 7, which schematically illustrates a method of communication during a TXOP, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include receiving at a first STA from a message a second STA including a first value to indicate the available memory size at the second STA at a beginning of a TXOP, and a second value to indicate a maximal length of an A-MPDU transmission during the TXOP. For example, controller 154 (FIG. 1) may be configured to cause, trigger, and/or control the wireless communication station implemented by device 140 (FIG. 1) to receive the message from device 102 (FIG. 1) including the first value to indicate the available memory size at device 102 (FIG. 1) at the beginning of the TXOP, and the second value to indicate the maximal length of an A-MPDU transmission during the TXOP, e.g., as described above.

As indicated at block 704, the method may include transmitting an initial A-MPDU to the second STA during the TXOP, a length of the initial A-MPDU is not longer than the first value. For example, controller 154 (FIG. 1) may be configured to cause, trigger, and/or control the wireless communication station implemented by device 140 (FIG. 1) to transmit the initial A-MPDU to device 102 (FIG. 1) during the TXOP, a length of the initial A-MPDU is not longer than the first value, e.g., as described above.

As indicated at block 706, the method may include receiving an Ack from the second STA to acknowledge the initial A-MPDU, the Ack including a buffer capacity field including a capacity value to indicate whether the first STA is to be allowed to send to the second STA a subsequent A-MPDU having a length which is not longer than the second value, the capacity value is based on a current available memory size at the second STA. For example, controller 154 (FIG. 1) may be configured to cause, trigger, and/or control the wireless communication station implemented by device 140 (FIG. 1) to receive the Ack from device 102 (FIG. 1) to acknowledge the initial A-MPDU, the Ack including the buffer capacity field including the capacity value to indicate whether device 140 (FIG. 1) is to be allowed to send to device 102 (FIG. 1) the subsequent A-MPDU having the length which is not longer than the second value, and the capacity value is based on the current available memory size at device 102 (FIG. 1), e.g., as described above.

Figure 8:
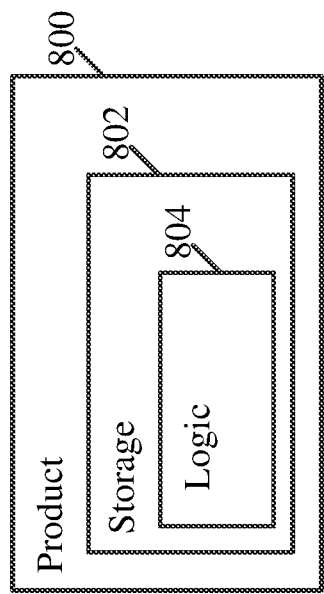
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148

(FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or machine-readable storage media 802 may include one or more types of computer-readable storage media capable of storing data, including volatile memory, non-volatile memory, removable or non-removable memory, erasable or non-erasable memory, writeable or re-writeable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless communication station (STA) to transmit to a second STA a message comprising a first value to indicate an available memory size at the first STA at a beginning of a Transmit Opportunity (TXOP), and a second value to indicate a maximal length of an Aggregate Medium Access Control (MAC) Protocol Data Unit (A-MPDU) transmission during the TXOP; receive an initial A-MPDU from the second STA during the TXOP, a length of the initial A-MPDU is not longer than the first value; determine a capacity value based on a current available memory size at the first STA, the capacity value to indicate whether the second STA is to be allowed to send to the first STA a subsequent A-MPDU having a length which is not longer than the second value; and transmit to the second STA an acknowledgment (Ack) to acknowledge the initial A-MPDU, the Ack comprising a buffer capacity field comprising the capacity value.

Example 2 includes the subject matter of Example 1, and optionally, wherein the apparatus is configured to cause the first STA to, when the current available memory size is lower than the second value, set the capacity value to indicate that the second STA is not allowed to send the subsequent A-MPDU to the first STA.

Example 3 includes the subject matter of Example 1 or 2, and optionally, wherein the apparatus is configured to cause the first STA to, when the current available memory size is not lower than the second value, set the capacity value to indicate that the second STA is allowed to send the subsequent A-MPDU to the first STA.

Example 4 includes the subject matter of any one of Examples 1-3, and optionally, wherein the apparatus is configured to cause the first STA to set the capacity value to a first predefined value to indicate that the second STA is not allowed to send the subsequent A-MPDU to the first STA, or to a second predefined value to indicate that the second STA is allowed to send the subsequent A-MPDU to the first STA.

Example 5 includes the subject matter of any one of Examples 1-4, and optionally, wherein the apparatus is configured to cause the first STA to, when the capacity value is to indicate that the second STA is not allowed to send the subsequent A-MPDU to the first STA, receive from the second STA an Ack request, and transmit to the second STA a subsequent Ack to acknowledge the Ack request, the subsequent Ack comprising an updated capacity value based on an updated current available memory size at the second STA, the updated capacity value to indicate whether the second STA is to be allowed to send the subsequent A-MPDU to the second STA.

Example 6 includes the subject matter of any one of Examples 1-5, and optionally, wherein the apparatus is configured to cause the first STA to, when the capacity value is to indicate that the second STA is allowed to send the subsequent A-MPDU to the first STA, receive the subsequent A-MPDU, determine an updated capacity value based on an updated current available memory size at the first STA, and transmit to the second STA a subsequent Ack to acknowledge the subsequent A-MPDU, the subsequent Ack comprising the updated capacity value.

Example 7 includes the subject matter of Example 1, and optionally, wherein the capacity value comprises a third value, which is less than the second value, the third value to indicate that the second STA is to be allowed to send to the first STA the subsequent A-MPDU having a length which is not longer than the third value.

Example 8 includes the subject matter of Example 7, and optionally, wherein the apparatus is configured to cause the first STA to receive the subsequent A-MPDU having the length which is not longer than the third value, to determine an updated capacity value based on an updated current available memory size at the first STA, and to transmit to the second STA a subsequent Ack to acknowledge the subsequent A-MPDU, the subsequent Ack comprising the updated capacity value.

Example 9 includes the subject matter of Example 7 or 8, and optionally, wherein the third value comprises a count value to indicate a count of memory units.

Example 10 includes the subject matter of any one of Examples 7-9, and optionally, wherein the apparatus is configured to cause the first STA to determine the current available memory size based on a shared memory, which is shared between at least first and second traffic identifiers (TIDs), to receive from the second STA a first A-MPDU corresponding to the first TID and a second A-MPDU corresponding to the second TID, and to update the current available memory size based on a length of the first A-MPDU and a length of the second A-MPDU.

Example 11 includes the subject matter of any one of Examples 7-9, and optionally, wherein the apparatus is configured to cause the first STA to determine the current available memory size based on a dedicated memory, which is dedicated to a traffic identifier (TID), and to update the current available memory size based on a length of an A-MPDU corresponding to the TID.

Example 12 includes the subject matter of any one of Examples 7-11, and optionally, wherein the apparatus is configured to cause the first STA to communicate with the second STA a capability indication to indicate that the first STA is capable to determine the third value.

Example 13 includes the subject matter of any one of Examples 1-12, and optionally, wherein the message comprises an association request or a probe request.

Example 14 includes the subject matter of any one of Examples 1-13, and optionally, wherein the Ack comprises a Block Ack (BA), and the buffer capacity field comprises a Receive Buffer Capacity (RBUFCAP) field.

Example 15 includes the subject matter of any one of Examples 1-14, and optionally, comprising a radio.

Example 16 includes the subject matter of any one of Examples 1-15, and optionally, comprising one or more antennas, a memory and a processor.

Example 17 includes a system of wireless communication comprising a first wireless communication station (STA), the first STA comprising one or more antennas; a radio; a memory; a processor; and a controller configured to cause the first STA to transmit to a second STA a message comprising a first value to indicate an available memory size at the first STA at a beginning of a Transmit Opportunity (TXOP), and a second value to indicate a maximal length of an Aggregate Medium Access Control (MAC) Protocol Data Unit (A-MPDU) transmission during the TXOP; receive an initial A-MPDU from the second STA during the TXOP, a length of the initial A-MPDU is not longer than the first value; determine a capacity value based on a current available memory size at the first STA, the capacity value to indicate whether the second STA is to be allowed to send to the first STA a subsequent A-MPDU having a length which is not longer than the second value; and transmit to the second STA an acknowledgment (Ack) to acknowledge the initial A-MPDU, the Ack comprising a buffer capacity field comprising the capacity value.

Example 18 includes the subject matter of Example 17, and optionally, wherein the controller is configured to cause the first STA to, when the current available memory size is lower than the second value, set the capacity value to indicate that the second STA is not allowed to send the subsequent A-MPDU to the first STA.

Example 19 includes the subject matter of Example 17 or 18, and optionally, wherein the controller is configured to cause the first STA to, when the current available memory size is not lower than the second value, set the capacity value to indicate that the second STA is allowed to send the subsequent A-MPDU to the first STA.

Example 20 includes the subject matter of any one of Examples 17-19, and optionally, wherein the controller is configured to cause the first STA to set the capacity value to a first predefined value to indicate that the second STA is not allowed to send the subsequent A-MPDU to the first STA, or to a second predefined value to indicate that the second STA is allowed to send the subsequent A-MPDU to the first STA.

Example 21 includes the subject matter of any one of Examples 17-20, and optionally, wherein the controller is configured to cause the first STA to, when the capacity value is to indicate that the second STA is not allowed to send the subsequent A-MPDU to the first STA, receive from the second STA an Ack request, and transmit to the second STA a subsequent Ack to acknowledge the Ack request, the subsequent Ack comprising an updated capacity value based on an updated current available memory size at the second STA, the updated capacity value to indicate whether the second STA is to be allowed to send the subsequent A-MPDU to the second STA.

Example 22 includes the subject matter of any one of Examples 17-21, and optionally, wherein the controller is configured to cause the first STA to, when the capacity value is to indicate that the second STA is allowed to send the subsequent A-MPDU to the first STA, receive the subsequent A-MPDU, determine an updated capacity value based on an updated current available memory size at the first STA, and transmit to the second STA a subsequent Ack to acknowledge the subsequent A-MPDU, the subsequent Ack comprising the updated capacity value.

Example 23 includes the subject matter of Example 17, and optionally, wherein the capacity value comprises a third value, which is less than the second value, the third value to indicate that the second STA is to be allowed to send to the first STA the subsequent A-MPDU having a length which is not longer than the third value.

Example 24 includes the subject matter of Example 23, and optionally, wherein the controller is configured to cause the first STA to receive the subsequent A-MPDU having the length which is not longer than the third value, to determine an updated capacity value based on an updated current available memory size at the first STA, and to transmit to the second STA a subsequent Ack to acknowledge the subsequent A-MPDU, the subsequent Ack comprising the updated capacity value.

Example 25 includes the subject matter of Example 23 or 24, and optionally, wherein the third value comprises a count value to indicate a count of memory units.

Example 26 includes the subject matter of any one of Examples 23-25, and optionally, wherein the controller is configured to cause the first STA to determine the current available memory size based on a shared memory, which is shared between at least first and second traffic identifiers (TIDs), to receive from the second STA a first A-MPDU corresponding to the first TID and a second A-MPDU corresponding to the second TID, and to update the current available memory size based on a length of the first A-MPDU and a length of the second A-MPDU.

Example 27 includes the subject matter of any one of Examples 23-25, and optionally, wherein the controller is configured to cause the first STA to determine the current available memory size based on a dedicated memory, which is dedicated to a traffic identifier (TID), and to update the current available memory size based on a length of an A-MPDU corresponding to the TID.

Example 28 includes the subject matter of any one of Examples 23-27, and optionally, wherein the controller is configured to cause the first STA to communicate with the second STA a capability indication to indicate that the first STA is capable to determine the third value.

Example 29 includes the subject matter of any one of Examples 17-28, and optionally, wherein the message comprises an association request or a probe request.

Example 30 includes the subject matter of any one of Examples 17-29, and optionally, wherein the Ack comprises a Block Ack (BA), and the buffer capacity field comprises a Receive Buffer Capacity (RBUFCAP) field.

Example 31 includes a method to be performed at a first wireless communication station (STA), the method comprising transmitting to a second STA a message comprising a first value to indicate an available memory size at the first STA at a beginning of a Transmit Opportunity (TXOP), and a second value to indicate a maximal length of an Aggregate Medium Access Control (MAC) Protocol Data Unit (A-MPDU) transmission during the TXOP; receiving an initial A-MPDU from the second STA during the TXOP, a length of the initial A-MPDU is not longer than the first value; determining a capacity value based on a current available memory size at the first STA, the capacity value to indicate whether the second STA is to be allowed to send to the first STA a subsequent A-MPDU having a length which is not longer than the second value; and transmitting to the second STA an acknowledgment (Ack) to acknowledge the initial A-MPDU, the Ack comprising a buffer capacity field comprising the capacity value.

Example 32 includes the subject matter of Example 31, and optionally, comprising, when the current available memory size is lower than the second value, setting the capacity value to indicate that the second STA is not allowed to send the subsequent A-MPDU to the first STA.

Example 33 includes the subject matter of Example 31 or 32, and optionally, comprising, when the current available memory size is not lower than the second value, setting the capacity value to indicate that the second STA is allowed to send the subsequent A-MPDU to the first STA.

Example 34 includes the subject matter of any one of Examples 31-33, and optionally, comprising setting the capacity value to a first predefined value to indicate that the second STA is not allowed to send the subsequent A-MPDU to the first STA, or to a second predefined value to indicate that the second STA is allowed to send the subsequent A-MPDU to the first STA.

Example 35 includes the subject matter of any one of Examples 31-34, and optionally, comprising, when the capacity value is to indicate that the second STA is not allowed to send the subsequent A-MPDU to the first STA, receiving from the second STA an Ack request, and transmitting to the second STA a subsequent Ack to acknowledge the Ack request, the subsequent Ack comprising an updated capacity value based on an updated current available memory size at the second STA, the updated capacity value to indicate whether the second STA is to be allowed to send the subsequent A-MPDU to the second STA.

Example 36 includes the subject matter of any one of Examples 31-35, and optionally, comprising, when the capacity value is to indicate that the second STA is allowed to send the subsequent A-MPDU to the first STA, receiving the subsequent A-MPDU, determining an updated capacity value based on an updated current available memory size at the first STA, and transmitting to the second STA a subsequent Ack to acknowledge the subsequent A-MPDU, the subsequent Ack comprising the updated capacity value.

Example 37 includes the subject matter of Example 31, and optionally, wherein the capacity value comprises a third value, which is less than the second value, the third value to indicate that the second STA is to be allowed to send to the first STA the subsequent A-MPDU having a length which is not longer than the third value.

Example 38 includes the subject matter of Example 37, and optionally, comprising receiving the subsequent A-MPDU having the length which is not longer than the third value, determining an updated capacity value based on an updated current available memory size at the first STA, and transmitting to the second STA a subsequent Ack to acknowledge the subsequent A-MPDU, the subsequent Ack comprising the updated capacity value.

Example 39 includes the subject matter of Example 37 or 38, and optionally, wherein the third value comprises a count value to indicate a count of memory units.

Example 40 includes the subject matter of any one of Examples 37-39, and optionally, comprising determining the current available memory size based on a shared memory, which is shared between at least first and second traffic identifiers (TIDs), receiving from the second STA a first A-MPDU corresponding to the first TID and a second A-MPDU corresponding to the second TID, and updating the current available memory size based on a length of the first A-MPDU and a length of the second A-MPDU.

Example 41 includes the subject matter of any one of Examples 37-39, and optionally, comprising determining the current available memory size based on a dedicated memory, which is dedicated to a traffic identifier (TID), and updating the current available memory size based on a length of an A-MPDU corresponding to the TID.

Example 42 includes the subject matter of any one of Examples 37-41, and optionally, comprising communicating with the second STA a capability indication to indicate that the first STA is capable to determine the third value.

Example 43 includes the subject matter of any one of Examples 31-42, and optionally, wherein the message comprises an association request or a probe request.

Example 44 includes the subject matter of any one of Examples 31-43, and optionally, wherein the Ack comprises a Block Ack (BA), and the buffer capacity field comprises a Receive Buffer Capacity (RBUFCAP) field.

Example 45 includes a product comprising one or more tangible computer-readable non-transitory storage media comprising computer-executable instructions operable to, when executed by at least one processor, enable the at least one processor to cause a first wireless communication station (STA) to transmit to a second STA a message comprising a first value to indicate an available memory size at the first STA at a beginning of a Transmit Opportunity (TXOP), and a second value to indicate a maximal length of an Aggregate Medium Access Control (MAC) Protocol Data Unit (A-MPDU) transmission during the TXOP; receive an initial A-MPDU from the second STA during the TXOP, a length of the initial A-MPDU is not longer than the first value; determine a capacity value based on a current available memory size at the first STA, the capacity value to indicate whether the second STA is to be allowed to send to the first STA a subsequent A-MPDU having a length which is not longer than the second value; and transmit to the second STA an acknowledgment (Ack) to acknowledge the initial A-MPDU, the Ack comprising a buffer capacity field comprising the capacity value.

Example 46 includes the subject matter of Example 45, and optionally, wherein the instructions, when executed, cause the first STA to, when the current available memory size is lower than the second value, set the capacity value to indicate that the second STA is not allowed to send the subsequent A-MPDU to the first STA.

Example 47 includes the subject matter of Example 45 or 46, and optionally, wherein the instructions, when executed, cause the first STA to, when the current available memory size is not lower than the second value, set the capacity value to indicate that the second STA is allowed to send the subsequent A-MPDU to the first STA.

Example 48 includes the subject matter of any one of Examples 45-47, and optionally, wherein the instructions, when executed, cause the first STA to set the capacity value to a first predefined value to indicate that the second STA is not allowed to send the subsequent A-MPDU to the first STA, or to a second predefined value to indicate that the second STA is allowed to send the subsequent A-MPDU to the first STA.

Example 49 includes the subject matter of any one of Examples 45-48, and optionally, wherein the instructions, when executed, cause the first STA to, when the capacity value is to indicate that the second STA is not allowed to send the subsequent A-MPDU to the first STA, receive from the second STA an Ack request, and transmit to the second STA a subsequent Ack to acknowledge the Ack request, the subsequent Ack comprising an updated capacity value based on an updated current available memory size at the second STA, the updated capacity value to indicate whether the second STA is to be allowed to send the subsequent A-MPDU to the second STA.

Example 50 includes the subject matter of any one of Examples 45-49, and optionally, wherein the instructions, when executed, cause the first STA to, when the capacity value is to indicate that the second STA is allowed to send the subsequent A-MPDU to the first STA, receive the subsequent A-MPDU, determine an updated capacity value based on an updated current available memory size at the first STA, and transmit to the second STA a subsequent Ack to acknowledge the subsequent A-MPDU, the subsequent Ack comprising the updated capacity value.

Example 51 includes the subject matter of Example 45, and optionally, wherein the capacity value comprises a third value, which is less than the second value, the third value to indicate that the second STA is to be allowed to send to the first STA the subsequent A-MPDU having a length which is not longer than the third value.

Example 52 includes the subject matter of Example 51, and optionally, wherein the instructions, when executed, cause the first STA to receive the subsequent A-MPDU having the length which is not longer than the third value, to determine an updated capacity value based on an updated current available memory size at the first STA, and to transmit to the second STA a subsequent Ack to acknowledge the subsequent A-MPDU, the subsequent Ack comprising the updated capacity value.

Example 53 includes the subject matter of Example 51 or 52, and optionally, wherein the third value comprises a count value to indicate a count of memory units.

Example 54 includes the subject matter of any one of Examples 51-53, and optionally, wherein the instructions, when executed, cause the first STA to determine the current available memory size based on a shared memory, which is shared between at least first and second traffic identifiers (TIDs), to receive from the second STA a first A-MPDU corresponding to the first TID and a second A-MPDU corresponding to the second TID, and to update the current available memory size based on a length of the first A-MPDU and a length of the second A-MPDU.

Example 55 includes the subject matter of any one of Examples 51-53, and optionally, wherein the instructions, when executed, cause the first STA to determine the current available memory size based on a dedicated memory, which is dedicated to a traffic identifier (TID), and to update the current available memory size based on a length of an A-MPDU corresponding to the TID.

Example 56 includes the subject matter of any one of Examples 51-55, and optionally, wherein the instructions, when executed, cause the first STA to communicate with the second STA a capability indication to indicate that the first STA is capable to determine the third value.

Example 57 includes the subject matter of any one of Examples 45-56, and optionally, wherein the message comprises an association request or a probe request.

Example 58 includes the subject matter of any one of Examples 45-57, and optionally, wherein the Ack comprises a Block Ack (BA), and the buffer capacity field comprises a Receive Buffer Capacity (RBUFCAP) field.

Example 59 includes an apparatus of wireless communication by a first wireless communication station (STA), the apparatus comprising means for transmitting to a second STA a message comprising a first value to indicate an available memory size at the first STA at a beginning of a Transmit Opportunity (TXOP), and a second value to indicate a maximal length of an Aggregate Medium Access Control (MAC) Protocol Data Unit (A-MPDU) transmission during the TXOP; means for receiving an initial A-MPDU from the second STA during the TXOP, a length of the initial A-MPDU is not longer than the first value; means for determining a capacity value based on a current available memory size at the first STA, the capacity value to indicate whether the second STA is to be allowed to send to the first STA a subsequent A-MPDU having a length which is not longer than the second value; and means for transmitting to the second STA an acknowledgment (Ack) to acknowledge the initial A-MPDU, the Ack comprising a buffer capacity field comprising the capacity value.

Example 60 includes the subject matter of Example 59, and optionally, comprising means for, when the current available memory size is lower than the second value, setting the capacity value to indicate that the second STA is not allowed to send the subsequent A-MPDU to the first STA.

Example 61 includes the subject matter of Example 59 or 60, and optionally, comprising means for, when the current available memory size is not lower than the second value, setting the capacity value to indicate that the second STA is allowed to send the subsequent A-MPDU to the first STA.

Example 62 includes the subject matter of any one of Examples 59-61, and optionally, comprising means for setting the capacity value to a first predefined value to indicate that the second STA is not allowed to send the subsequent A-MPDU to the first STA, or to a second predefined value to indicate that the second STA is allowed to send the subsequent A-MPDU to the first STA.

Example 63 includes the subject matter of any one of Examples 59-62, and optionally, comprising means for, when the capacity value is to indicate that the second STA is not allowed to send the subsequent A-MPDU to the first STA, receiving from the second STA an Ack request, and transmitting to the second STA a subsequent Ack to acknowledge the Ack request, the subsequent Ack comprising an updated capacity value based on an updated current available memory size at the second STA, the updated capacity value to indicate whether the second STA is to be allowed to send the subsequent A-MPDU to the second STA.

Example 64 includes the subject matter of any one of Examples 59-63, and optionally, comprising means for, when the capacity value is to indicate that the second STA is allowed to send the subsequent A-MPDU to the first STA, receiving the subsequent A-MPDU, determining an updated capacity value based on an updated current available memory size at the first STA, and transmitting to the second STA a subsequent Ack to acknowledge the subsequent A-MPDU, the subsequent Ack comprising the updated capacity value.

Example 65 includes the subject matter of Example 59, and optionally, wherein the capacity value comprises a third value, which is less than the second value, the third value to indicate that the second STA is to be allowed to send to the first STA the subsequent A-MPDU having a length which is not longer than the third value.

Example 66 includes the subject matter of Example 65, and optionally, comprising means for receiving the subsequent A-MPDU having the length which is not longer than the third value, determining an updated capacity value based on an updated current available memory size at the first STA, and transmitting to the second STA a subsequent Ack to acknowledge the subsequent A-MPDU, the subsequent Ack comprising the updated capacity value.

Example 67 includes the subject matter of Example 65 or 67, and optionally, wherein the third value comprises a count value to indicate a count of memory units.

Example 68 includes the subject matter of any one of Examples 65-67, and optionally, comprising means for determining the current available memory size based on a shared memory, which is shared between at least first and second traffic identifiers (TIDs), receiving from the second STA a first A-MPDU corresponding to the first TID and a second A-MPDU corresponding to the second TID, and updating the current available memory size based on a length of the first A-MPDU and a length of the second A-MPDU.

Example 69 includes the subject matter of any one of Examples 65-67, and optionally, comprising means for determining the current available memory size based on a dedicated memory, which is dedicated to a traffic identifier (TID), and updating the current available memory size based on a length of an A-MPDU corresponding to the TID.

Example 70 includes the subject matter of any one of Examples 65-69, and optionally, comprising means for communicating with the second STA a capability indication to indicate that the first STA is capable to determine the third value.

Example 71 includes the subject matter of any one of Examples 59-70, and optionally, wherein the message comprises an association request or a probe request.

Example 72 includes the subject matter of any one of Examples 59-71, and optionally, wherein the Ack comprises a Block Ack (BA), and the buffer capacity field comprises a Receive Buffer Capacity (RBUFCAP) field.

Example 73 includes an apparatus comprising logic and circuitry configured to cause a first wireless communication station (STA) to receive from a second STA a message comprising a first value to indicate an available memory size at the second STA at a beginning of a Transmit Opportunity (TXOP), and a second value to indicate a maximal length of an Aggregate Medium Access Control (MAC) Protocol Data Unit (A-MPDU) transmission during the TXOP; transmit an initial A-MPDU to the second STA during the TXOP, a length of the initial A-MPDU is not longer than the first value; and receive an acknowledgment (Ack) from the second STA to acknowledge the initial A-MPDU, the Ack comprising a buffer capacity field comprising a capacity value to indicate whether the first STA is to be allowed to send to the second STA a subsequent A-MPDU having a length which is not longer than the second value, the capacity value is based on a current available memory size at the second STA.

Example 74 includes the subject matter of Example 73, and optionally, wherein the apparatus is configured to cause the first STA to select not to transmit the subsequent A-MPDU when the capacity value is to indicate that the first STA is not allowed to send the subsequent A-MPDU.

Example 75 includes the subject matter of Example 73 or 74, and optionally, wherein the apparatus is configured to allow the first STA to transmit the subsequent A-MPDU when the capacity value is to indicate that the first STA is allowed to send the subsequent A-MPDU.

Example 76 includes the subject matter of any one of Examples 73-75, and optionally, wherein the capacity value comprises a first predefined value to indicate that the first STA is not allowed to send the subsequent A-MPDU to the second STA, or a second predefined value to indicate that the first STA is allowed to send the subsequent A-MPDU to the first STA.

Example 77 includes the subject matter of any one of Examples 73-75, and optionally, wherein the apparatus is configured to cause the first STA to, when the capacity value is to indicate that the first STA is not allowed to send the subsequent A-MPDU to the second STA, send an Ack request to the second STA, and receive from the second STA a subsequent Ack to acknowledge the Ack request, the subsequent Ack comprising an updated capacity value based on an updated current available memory size at the second STA, the updated capacity value to indicate whether the first STA is to be allowed to send the subsequent A-MPDU to the second STA.

Example 78 includes the subject matter of any one of Examples 73-76, and optionally, wherein the apparatus is configured to cause the first STA to, when the capacity value is to indicate that the first STA is allowed to send the subsequent A-MPDU to the second STA, transmit the subsequent A-MPDU, and receive from the second STA a subsequent Ack to acknowledge the subsequent A-MPDU, the subsequent Ack comprising an updated capacity value based on an updated current available memory size at the second STA.

Example 79 includes the subject matter of Example 73, and optionally, wherein the capacity value comprises a third value, which is less than the second value, the third value to indicate that the first STA is to be allowed to send to the second STA the subsequent A-MPDU having a length which is not longer than the third value.

Example 80 includes the subject matter of Example 79, and optionally, wherein the apparatus is configured to cause the first STA to transmit to the second STA the subsequent A-MPDU having the length which is not longer than the third value, and receive from the second STA a subsequent Ack to acknowledge receipt of the subsequent A-MPDU, the subsequent Ack comprising an updated capacity value, which is based on an updated current available memory size at the second STA.

Example 81 includes the subject matter of Example 79 or 80, and optionally, wherein the third value comprises a count value to indicate a count of memory units, the apparatus configured to cause the first STA to determine an allowed length of the subsequent A-MPDU based on a product of the count value and a memory unit size.

Example 82 includes the subject matter of any one of Examples 79-81, and optionally, wherein the capacity value corresponds to a current available memory of a shared memory, which is shared between a plurality of Traffic Identifiers (TIDs), the apparatus configured to cause the first STA to transmit the subsequent A-MPDU having the length which is not longer than the second value when the subsequent A-MPDU corresponds to a TID of the plurality of the TIDs.

Example 83 includes the subject matter of any one of Examples 79-81, and optionally, wherein the capacity value corresponds to a current available memory of a dedicated memory, which is dedicated to a TID, the apparatus configured to cause the first STA to transmit the subsequent A-MPDU having a length which is not longer than the second value, when the subsequent A-MPDU corresponds to the TID.

Example 84 includes the subject matter of any one of Examples 79-83, and optionally, wherein the apparatus is configured to cause the first STA to communicate with the second STA a capability indication to indicate that the first STA is capable to send the subsequent A-MPDU having the length, which is not longer than the third value.

Example 85 includes the subject matter of any one of Examples 73-84, and optionally, wherein the message comprises an association request or a probe request.

Example 86 includes the subject matter of any one of Examples 73-85, and optionally, wherein the Ack comprises a Block Ack (BA), and the buffer capacity field comprises a Receive Buffer Capacity (RBUFCAP) field.

Example 87 includes the subject matter of any one of Examples 73-86, and optionally, comprising a radio.

Example 88 includes the subject matter of any one of Examples 73-87, and optionally, comprising one or more antennas, a memory and a processor.

Example 89 includes a system of wireless communication comprising a first wireless communication station (STA), the first STA comprising one or more antennas; a radio; a memory; a processor; and a controller configured to cause the first STA to receive from a second STA a message comprising a first value to indicate an available memory size at the second STA at a beginning of a Transmit Opportunity (TXOP), and a second value to indicate a maximal length of an Aggregate Medium Access Control (MAC) Protocol Data Unit (A-MPDU) transmission during the TXOP; transmit an initial A-MPDU to the second STA during the TXOP, a length of the initial A-MPDU is not longer than the first value; and receive an acknowledgment (Ack) from the second STA to acknowledge the initial A-MPDU, the Ack comprising a buffer capacity field comprising a capacity value to indicate whether the first STA is to be allowed to send to the second STA a subsequent A-MPDU having a length which is not longer than the second value, the capacity value is based on a current available memory size at the second STA.

Example 90 includes the subject matter of Example 89, and optionally, wherein the controller is configured to cause the first STA to select not to transmit the subsequent A-MPDU when the capacity value is to indicate that the first STA is not allowed to send the subsequent A-MPDU.

Example 91 includes the subject matter of Example 89 or 90, and optionally, wherein the controller is configured to allow the first STA to transmit the subsequent A-MPDU when the capacity value is to indicate that the first STA is allowed to send the subsequent A-MPDU.

Example 92 includes the subject matter of any one of Examples 89-91, and optionally, wherein the capacity value comprises a first predefined value to indicate that the first STA is not allowed to send the subsequent A-MPDU to the second STA, or a second predefined value to indicate that the first STA is allowed to send the subsequent A-MPDU to the first STA.

Example 93 includes the subject matter of any one of Examples 89-91, and optionally, wherein the controller is configured to cause the first STA to, when the capacity value is to indicate that the first STA is not allowed to send the subsequent A-MPDU to the second STA, send an Ack request to the second STA, and receive from the second STA a subsequent Ack to acknowledge the Ack request, the subsequent Ack comprising an updated capacity value based on an updated current available memory size at the second STA, the updated capacity value to indicate whether the first STA is to be allowed to send the subsequent A-MPDU to the second STA.

Example 94 includes the subject matter of any one of Examples 89-92, and optionally, wherein the controller is configured to cause the first STA to, when the capacity value is to indicate that the first STA is allowed to send the subsequent A-MPDU to the second STA, transmit the subsequent A-MPDU, and receive from the second STA a subsequent Ack to acknowledge the subsequent A-MPDU, the subsequent Ack comprising an updated capacity value based on an updated current available memory size at the second STA.

Example 95 includes the subject matter of Example 89, and optionally, wherein the capacity value comprises a third value, which is less than the second value, the third value to indicate that the first STA is to be allowed to send to the second STA the subsequent A-MPDU having a length which is not longer than the third value.

Example 96 includes the subject matter of Example 95, and optionally, wherein the controller is configured to cause the first STA to transmit to the second STA the subsequent A-MPDU having the length which is not longer than the third value, and receive from the second STA a subsequent Ack to acknowledge receipt of the subsequent A-MPDU, the subsequent Ack comprising an updated capacity value, which is based on an updated current available memory size at the second STA.

Example 97 includes the subject matter of Example 95 or 96, and optionally, wherein the third value comprises a count value to indicate a count of memory units, the controller is configured to cause the first STA to determine an allowed length of the subsequent A-MPDU based on a product of the count value and a memory unit size.

Example 98 includes the subject matter of any one of Examples 95-97, and optionally, wherein the capacity value corresponds to a current available memory of a shared memory, which is shared between a plurality of Traffic Identifiers (TIDs), the controller is configured to cause the first STA to transmit the subsequent A-MPDU having the length which is not longer than the second value when the subsequent A-MPDU corresponds to a TID of the plurality of the TIDs.

Example 99 includes the subject matter of any one of Examples 95-97, and optionally, wherein the capacity value corresponds to a current available memory of a dedicated memory, which is dedicated to a TID, the controller is configured to cause the first STA to transmit the subsequent A-MPDU having a length which is not longer than the second value, when the subsequent A-MPDU corresponds to the TID.

Example 100 includes the subject matter of any one of Examples 95-99, and optionally, wherein the controller is configured to cause the first STA to communicate with the second STA a capability indication to indicate that the first STA is capable to send the subsequent A-MPDU having the length, which is not longer than the third value.

Example 101 includes the subject matter of any one of Examples 89-100, and optionally, wherein the message comprises an association request or a probe request.

Example 102 includes the subject matter of any one of Examples 89-101, and optionally, wherein the Ack comprises a Block Ack (BA), and the buffer capacity field comprises a Receive Buffer Capacity (RBUFCAP) field.

Example 103 includes a method to be performed at a first wireless communication station (STA), the method comprising receiving from a second STA a message comprising a first value to indicate an available memory size at the second STA at a beginning of a Transmit Opportunity (TXOP), and a second value to indicate a maximal length of an Aggregate Medium Access Control (MAC) Protocol Data Unit (A-MPDU) transmission during the TXOP; transmitting an initial A-MPDU to the second STA during the TXOP, a length of the initial A-MPDU is not longer than the first value; and receiving an acknowledgment (Ack) from the second STA to acknowledge the initial A-MPDU, the Ack comprising a buffer capacity field comprising a capacity value to indicate whether the first STA is to be allowed to send to the second STA a subsequent A-MPDU having a length which is not longer than the second value, the capacity value is based on a current available memory size at the second STA.

Example 104 includes the subject matter of Example 103, and optionally, comprising selecting not to transmit the subsequent A-MPDU when the capacity value is to indicate that the first STA is not allowed to send the subsequent A-MPDU.

Example 105 includes the subject matter of Example 103 or 104, and optionally, comprising allowing the first STA to transmit the subsequent A-MPDU when the capacity value is to indicate that the first STA is allowed to send the subsequent A-MPDU.

Example 106 includes the subject matter of any one of Examples 103-105, and optionally, wherein the capacity value comprises a first predefined value to indicate that the first STA is not allowed to send the subsequent A-MPDU to the second STA, or a second predefined value to indicate that the first STA is allowed to send the subsequent A-MPDU to the first STA.

Example 107 includes the subject matter of any one of Examples 103-105, and optionally, comprising, when the capacity value is to indicate that the first STA is not allowed to send the subsequent A-MPDU to the second STA, sending an Ack request to the second STA, and receiving from the second STA a subsequent Ack to acknowledge the Ack request, the subsequent Ack comprising an updated capacity value based on an updated current available memory size at the second STA, the updated capacity value to indicate whether the first STA is to be allowed to send the subsequent A-MPDU to the second STA.

Example 108 includes the subject matter of any one of Examples 103-106, and optionally, comprising, when the capacity value is to indicate that the first STA is allowed to send the subsequent A-MPDU to the second STA, transmitting the subsequent A-MPDU, and receiving from the second STA a subsequent Ack to acknowledge the subsequent A-MPDU, the subsequent Ack comprising an updated capacity value based on an updated current available memory size at the second STA.

Example 109 includes the subject matter of Example 103, and optionally, wherein the capacity value comprises a third value, which is less than the second value, the third value to indicate that the first STA is to be allowed to send to the second STA the subsequent A-MPDU having a length which is not longer than the third value.

Example 110 includes the subject matter of Example 109, and optionally, comprising transmitting to the second STA the subsequent A-MPDU having the length which is not longer than the third value, and receiving from the second STA a subsequent Ack to acknowledge receipt of the subsequent A-MPDU, the subsequent Ack comprising an updated capacity value, which is based on an updated current available memory size at the second STA.

Example 111 includes the subject matter of Example 109 or 110, and optionally, wherein the third value comprises a count value to indicate a count of memory units, the method comprising determining an allowed length of the subsequent A-MPDU based on a product of the count value and a memory unit size.

Example 112 includes the subject matter of any one of Examples 109-111, and optionally, wherein the capacity value corresponds to a current available memory of a shared memory, which is shared between a plurality of Traffic Identifiers (TIDs), the method comprising transmitting the subsequent A-MPDU having the length which is not longer than the second value when the subsequent A-MPDU corresponds to a TID of the plurality of the TIDs.

Example 113 includes the subject matter of any one of Examples 109-111, and optionally, wherein the capacity value corresponds to a current available memory of a dedicated memory, which is dedicated to a TID, the method comprising transmitting the subsequent A-MPDU having a length which is not longer than the second value, when the subsequent A-MPDU corresponds to the TID.

Example 114 includes the subject matter of any one of Examples 109-113, and optionally, comprising communicating with the second STA a capability indication to indicate that the first STA is capable to send the subsequent A-MPDU having the length, which is not longer than the third value.

Example 115 includes the subject matter of any one of Examples 103-114, and optionally, wherein the message comprises an association request or a probe request.

Example 116 includes the subject matter of any one of Examples 103-115, and optionally, wherein the Ack comprises a Block Ack (BA), and the buffer capacity field comprises a Receive Buffer Capacity (RBUFCAP) field.

Example 117 includes a product comprising one or more tangible computer-readable non-transitory storage media comprising computer-executable instructions operable to, when executed by at least one processor, enable the at least one processor to cause a first wireless communication station (STA) to receive from a second STA a message comprising a first value to indicate an available memory size at the second STA at a beginning of a Transmit Opportunity (TXOP), and a second value to indicate a maximal length of an Aggregate Medium Access Control (MAC) Protocol Data Unit (A-MPDU) transmission during the TXOP; transmit an initial A-MPDU to the second STA during the TXOP, a length of the initial A-MPDU is not longer than the first value; and receive an acknowledgment (Ack) from the second STA to acknowledge the initial A-MPDU, the Ack comprising a buffer capacity field comprising a capacity value to indicate whether the first STA is to be allowed to send to the second STA a subsequent A-MPDU having a length which is not longer than the second value, the capacity value is based on a current available memory size at the second STA.

Example 118 includes the subject matter of Example 117, and optionally, wherein the instructions, when executed, cause the first STA to select not to transmit the subsequent A-MPDU when the capacity value is to indicate that the first STA is not allowed to send the subsequent A-MPDU.

Example 119 includes the subject matter of Example 117 or 118, and optionally, wherein the instructions, when executed, allow the first STA to transmit the subsequent A-MPDU when the capacity value is to indicate that the first STA is allowed to send the subsequent A-MPDU.

Example 120 includes the subject matter of any one of Examples 117-119, and optionally, wherein the capacity value comprises a first predefined value to indicate that the first STA is not allowed to send the subsequent A-MPDU to the second STA, or a second predefined value to indicate that the first STA is allowed to send the subsequent A-MPDU to the first STA.

Example 121 includes the subject matter of any one of Examples 117-119, and optionally, wherein the instructions, when executed, cause the first STA to, when the capacity value is to indicate that the first STA is not allowed to send the subsequent A-MPDU to the second STA, send an Ack request to the second STA, and receive from the second STA a subsequent Ack to acknowledge the Ack request, the subsequent Ack comprising an updated capacity value based on an updated current available memory size at the second STA, the updated capacity value to indicate whether the first STA is to be allowed to send the subsequent A-MPDU to the second STA.

Example 122 includes the subject matter of any one of Examples 117-120, and optionally, wherein the instructions, when executed, cause the first STA to, when the capacity value is to indicate that the first STA is allowed to send the subsequent A-MPDU to the second STA, transmit the subsequent A-MPDU, and receive from the second STA a subsequent Ack to acknowledge the subsequent A-MPDU, the subsequent Ack comprising an updated capacity value based on an updated current available memory size at the second STA.

Example 123 includes the subject matter of Example 117, and optionally, wherein the capacity value comprises a third value, which is less than the second value, the third value to indicate that the first STA is to be allowed to send to the second STA the subsequent A-MPDU having a length which is not longer than the third value.

Example 124 includes the subject matter of Example 123, and optionally, wherein the instructions, when executed, cause the first STA to transmit to the second STA the subsequent A-MPDU having the length which is not longer than the third value, and receive from the second STA a subsequent Ack to acknowledge receipt of the subsequent A-MPDU, the subsequent Ack comprising an updated capacity value, which is based on an updated current available memory size at the second STA.

Example 125 includes the subject matter of Example 123 or 124, and optionally, wherein the third value comprises a count value to indicate a count of memory units, the instructions, when executed, cause the first STA to determine an allowed length of the subsequent A-MPDU based on a product of the count value and a memory unit size.

Example 126 includes the subject matter of any one of Examples 123-125, and optionally, wherein the capacity value corresponds to a current available memory of a shared memory, which is shared between a plurality of Traffic Identifiers (TIDs), the instructions, when executed, cause the first STA to transmit the subsequent A-MPDU having the length which is not longer than the second value when the subsequent A-MPDU corresponds to a TID of the plurality of the TIDs.

Example 127 includes the subject matter of any one of Examples 123-125, and optionally, wherein the capacity value corresponds to a current available memory of a dedicated memory, which is dedicated to a TID, the instructions, when executed, cause the first STA to transmit the subsequent A-MPDU having a length which is not longer than the second value, when the subsequent A-MPDU corresponds to the TID.

Example 128 includes the subject matter of any one of Examples 123-127, and optionally, wherein the instructions, when executed, cause the first STA to communicate with the second STA a capability indication to indicate that the first STA is capable to send the subsequent A-MPDU having the length, which is not longer than the third value.

Example 129 includes the subject matter of any one of Examples 117-128, and optionally, wherein the message comprises an association request or a probe request.

Example 130 includes the subject matter of any one of Examples 117-129, and optionally, wherein the Ack comprises a Block Ack (BA), and the buffer capacity field comprises a Receive Buffer Capacity (RBUFCAP) field.

Example 131 includes an apparatus of wireless communication by a first wireless communication station (STA), the apparatus comprising means for receiving from a second STA a message comprising a first value to indicate an available memory size at the second STA at a beginning of a Transmit Opportunity (TXOP), and a second value to indicate a maximal length of an Aggregate Medium Access Control (MAC) Protocol Data Unit (A-MPDU) transmission during the TXOP; means for transmitting an initial A-MPDU to the second STA during the TXOP, a length of the initial A-MPDU is not longer than the first value; and means for receiving an acknowledgment (Ack) from the second STA to acknowledge the initial A-MPDU, the Ack comprising a buffer capacity field comprising a capacity value to indicate whether the first STA is to be allowed to send to the second STA a subsequent A-MPDU having a length which is not longer than the second value, the capacity value is based on a current available memory size at the second STA.

Example 132 includes the subject matter of Example 131, and optionally, comprising means for selecting not to transmit the subsequent A-MPDU when the capacity value is to indicate that the first STA is not allowed to send the subsequent A-MPDU.

Example 133 includes the subject matter of Example 131 or 132, and optionally, comprising means for allowing the first STA to transmit the subsequent A-MPDU when the capacity value is to indicate that the first STA is allowed to send the subsequent A-MPDU.

Example 134 includes the subject matter of any one of Examples 131-133, and optionally, wherein the capacity value comprises a first predefined value to indicate that the first STA is not allowed to send the subsequent A-MPDU to the second STA, or a second predefined value to indicate that the first STA is allowed to send the subsequent A-MPDU to the first STA.

Example 135 includes the subject matter of any one of Examples 131-133, and optionally, comprising means for, when the capacity value is to indicate that the first STA is not allowed to send the subsequent A-MPDU to the second STA, sending an Ack request to the second STA, and receiving from the second STA a subsequent Ack to acknowledge the Ack request, the subsequent Ack comprising an updated capacity value based on an updated current available memory size at the second STA, the updated capacity value to indicate whether the first STA is to be allowed to send the subsequent A-MPDU to the second STA.

Example 136 includes the subject matter of any one of Examples 131-134, and optionally, comprising means for, when the capacity value is to indicate that the first STA is allowed to send the subsequent A-MPDU to the second STA, transmitting the subsequent A-MPDU, and receiving from the second STA a subsequent Ack to acknowledge the subsequent A-MPDU, the subsequent Ack comprising an updated capacity value based on an updated current available memory size at the second STA.

Example 137 includes the subject matter of Example 131, and optionally, wherein the capacity value comprises a third value, which is less than the second value, the third value to indicate that the first STA is to be allowed to send to the second STA the subsequent A-MPDU having a length which is not longer than the third value.

Example 138 includes the subject matter of Example 137, and optionally, comprising means for transmitting to the second STA the subsequent A-MPDU having the length which is not longer than the third value, and receiving from the second STA a subsequent Ack to acknowledge receipt of the subsequent A-MPDU, the subsequent Ack comprising an updated capacity value, which is based on an updated current available memory size at the second STA.

Example 139 includes the subject matter of Example 137 or 138, and optionally, wherein the third value comprises a count value to indicate a count of memory units, the apparatus comprising means for determining an allowed length of the subsequent A-MPDU based on a product of the count value and a memory unit size.

Example 140 includes the subject matter of any one of Examples 137-139, and optionally, wherein the capacity value corresponds to a current available memory of a shared memory, which is shared between a plurality of Traffic Identifiers (TIDs), the apparatus comprising means for transmitting the subsequent A-MPDU having the length which is not longer than the second value when the subsequent A-MPDU corresponds to a TID of the plurality of the TIDs.

Example 141 includes the subject matter of any one of Examples 137-139, and optionally, wherein the capacity value corresponds to a current available memory of a dedicated memory, which is dedicated to a TID, the apparatus comprising means for transmitting the subsequent A-MPDU having a length which is not longer than the second value, when the subsequent A-MPDU corresponds to the TID.

Example 142 includes the subject matter of any one of Examples 137-141, and optionally, comprising means for communicating with the second STA a capability indication to indicate that the first STA is capable to send the subsequent A-MPDU having the length, which is not longer than the third value.

Example 143 includes the subject matter of any one of Examples 131-142, and optionally, wherein the message comprises an association request or a probe request.

Example 144 includes the subject matter of any one of Examples 131-143, and optionally, wherein the Ack comprises a Block Ack (BA), and the buffer capacity field comprises a Receive Buffer Capacity (RBUFCAP) field.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause a first Enhanced Directional Multi-Gigabit (EDMG) wireless communication station (STA) to:
   process a first field from a second EDMG STA, the first field comprising a first value to indicate a first length, the first length corresponding to a memory size at the second EDMG STA at a beginning of a Transmit Opportunity (TXOP);
   process a second field from the second EDMG STA, the second field comprising a second value to indicate a second length, the second length comprising a maximal length of an Aggregate Medium Access Control (MAC) Protocol Data Unit (A-MPDU) transmission, the first value is less than or equal to the second value;
   transmit a first A-MPDU to the second EDMG STA during the TXOP, a length of the first A-MPDU is not longer than the first length;
   process a Block Acknowledgment (BlockAck) from the second EDMG STA to acknowledge the first A-MPDU, the BlockAck comprising a Receive Buffer Capacity (RBUFCAP) value based on an available memory size at the second EDMG STA; and
   based on the RBUFCAP value, determine whether the first EDMG STA is to be allowed to transmit to the second STA a second A-MPDU having a length, which is not longer than the second length.

2. The apparatus of claim 1 configured to cause the first EDMG STA to, when the RBUFCAP value is to indicate a third length, which is shorter than the second length, limit the second A-MPDU to the third length.

3. The apparatus of claim 2 configured to cause the first EDMG STA to determine the third length to be equal to a product of the RBUFCAP value and a unit size.

4. The apparatus of claim 3 configured to cause the first EDMG STA to process a flow control field from the second EDMG STA, the flow control field comprising the unit size.

5. The apparatus of claim 3 configured to cause the first EDMG STA to transmit to the second EDMG STA an Add Block Acknowledgment (ADDBA) request, and to process an ADDBA response from the second EDMG STA in response to the ADDBA request, the ADDBA response comprising the unit size.

6. The apparatus of claim 3 configured to cause the first EDMG STA to identify, based on a capability indication from the second EDMG STA, that the second EDMG STA is capable to determine the RBUFCAP value based on the unit size.

7. The apparatus of claim 1 configured to cause the first EDMG STA to select not to transmit the second A-MPDU when the RBUFCAP value comprises a predefined value to indicate that the first EDMG STA is not allowed to transmit the second A-MPDU.

8. The apparatus of claim 1 configured to allow the first EDMG STA to transmit the second A-MPDU when the RBUFCAP value comprises a predefined value to indicate that the first EDMG STA is allowed to transmit the second A-MPDU.

9. The apparatus of claim 1 comprising a radio, the processor configured to cause the radio to transmit the first A-MPDU.

10. The apparatus of claim 9 comprising one or more antennas connected to the radio, and another processor to execute instructions of an operating system.

11. A product comprising one or more tangible computer-readable non-transitory storage media comprising computer-executable instructions operable to, when executed by at least one processor, enable the at least one processor to cause a first Enhanced Directional Multi-Gigabit (EDMG) wireless communication station (STA) to:
  process a first field from a second EDMG STA, the first field comprising a first value to indicate a first length, the first length corresponding to a memory size at the second EDMG STA at a beginning of a Transmit Opportunity (TXOP);
  process a second field from the second EDMG STA, the second field comprising a second value to indicate a second length, the second length comprising a maximal length of an Aggregate Medium Access Control (MAC) Protocol Data Unit (A-MPDU) transmission, the first value is less than or equal to the second value;
  transmit a first A-MPDU to the second EDMG STA during the TXOP, a length of the first A-MPDU is not longer than the first length;
  process a Block Acknowledgment (BlockAck) from the second EDMG STA to acknowledge the first A-MPDU, the BlockAck comprising a Receive Buffer Capacity (RBUFCAP) value based on an available memory size at the second EDMG STA; and
  based on the RBUFCAP value, determine whether the first EDMG STA is to be allowed to transmit to the second STA a second A-MPDU having a length, which is not longer than the second length.

12. The product of claim 11, wherein the instructions, when executed, cause the first EDMG STA to, when the RBUFCAP value is to indicate a third length, which is shorter than the second length, limit the second A-MPDU to the third length.

13. The product of claim 12, wherein the instructions, when executed, cause the first EDMG STA to determine the third length to be equal to a product of the RBUFCAP value and a unit size.

14. The product of claim 13, wherein the instructions, when executed, cause the first EDMG STA to process a flow control field from the second EDMG STA, the flow control field comprising the unit size.

15. The product of claim 13, wherein the instructions, when executed, cause the first EDMG STA to transmit to the second EDMG STA an Add Block Acknowledgment (ADDBA) request, and to process an ADDBA response from the second EDMG STA in response to the ADDBA request, the ADDBA response comprising the unit size.

16. The product of claim 13, wherein the instructions, when executed, cause the first EDMG STA to identify, based on a capability indication from the second EDMG STA, that the second EDMG STA is capable to determine the RBUFCAP value based on the unit size.

17. The product of claim 11, wherein the instructions, when executed, cause the first EDMG STA to select not to transmit the second A-MPDU when the RBUFCAP value comprises a predefined value to indicate that the first EDMG STA is not allowed to transmit the second A-MPDU.

18. The product of claim 11, wherein the instructions, when executed, allow the first EDMG STA to transmit the second A-MPDU when the RBUFCAP value comprises a predefined value to indicate that the first EDMG STA is allowed to transmit the second A-MPDU.

19. An apparatus comprising:
  means for processing at a first Enhanced Directional Multi-Gigabit (EDMG) wireless communication station (STA) a first field from a second EDMG STA, the first field comprising a first value to indicate a first length, the first length corresponding to a memory size at the second EDMG STA at a beginning of a Transmit Opportunity (TXOP);
  means for processing at the first EDMG STA a second field from the second EDMG STA, the second field comprising a second value to indicate a second length, the second length comprising a maximal length of an Aggregate Medium Access Control (MAC) Protocol Data Unit (A-MPDU) transmission, the first value is less than or equal to the second value;
  means for causing the first EDMG STA to transmit a first A-MPDU to the second EDMG STA during the TXOP, a length of the first A-MPDU is not longer than the first length;
  means for processing at the first EDMG STA a Block Acknowledgment (BlockAck) from the second EDMG STA to acknowledge the first A-MPDU, the BlockAck comprising a Receive Buffer Capacity (RBUFCAP) value based on an available memory size at the second EDMG STA; and
  means for, based on the RBUFCAP value, selectively allowing the first EDMG STA to transmit to the second STA a second A-MPDU having a length, which is not longer than the second length.

20. The apparatus of claim 19 comprising means for causing the first EDMG STA to, when the RBUFCAP value is to indicate a third length, which is shorter than the second length, limit the second A-MPDU to the third length.

* * * * *